US012724308B2

(12) United States Patent
Igeta et al.

(10) Patent No.: US 12,724,308 B2
(45) Date of Patent: Sep. 1, 2026

(54) METHOD OF MANUFACTURING DISPLAY DEVICE

(71) Applicant: Japan Display Inc., Tokyo (JP)

(72) Inventors: Koichi Igeta, Tokyo (JP); Ayaka Higuchi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 488 days.

(21) Appl. No.: 18/467,730

(22) Filed: Sep. 15, 2023

(65) Prior Publication Data

US 2024/0004240 A1 Jan. 4, 2024

Related U.S. Application Data

(63) Continuation of application No. PCT/JP2022/008867, filed on Mar. 2, 2022.

(30) Foreign Application Priority Data

Mar. 15, 2021 (JP) ................................ 2021-040978

(51) Int. Cl.

*G02F 1/1337* (2006.01)
*C09K 19/38* (2006.01)
*G02F 1/1334* (2006.01)

(52) U.S. Cl.

CPC .... *G02F 1/133788* (2013.01); *C09K 19/3809* (2013.01); *G02F 1/1334* (2013.01)

(58) Field of Classification Search

CPC ... G02G 1/133; G02G 1/1334; C09K 19/3809
USPC ..................................................... 445/23–25
See application file for complete search history.

(56) References Cited

U.S. PATENT DOCUMENTS

2015/0378218 A1* 12/2015 Chai ................. G02F 1/133788 427/444
2017/0103715 A1 4/2017 Oyama

FOREIGN PATENT DOCUMENTS

| | | | |
|---|---|---|---|
| CN | 103387833 | A | 11/2013 |
| JP | 2017-076006 | A | 4/2017 |
| JP | 2018-040979 | A | 3/2018 |
| JP | 2020177168 | A | 10/2020 |
| WO | 2018/143017 | A1 | 8/2018 |

OTHER PUBLICATIONS

Chinese Office Action issued Sep. 4, 2025, in corresponding CN Application No. 202280020848.3, 21pp.

(Continued)

*Primary Examiner* — Joseph L Williams
(74) *Attorney, Agent, or Firm* — XSENSUS LLP

(57) ABSTRACT

According to one embodiment, a method of manufacturing a display device comprises applying an alignment film material containing a photolytic component and a non-photolytic component to a surface of a first substrate and a surface of a second substrate, forming a first alignment film on the first substrate and a second alignment film on the second substrate, introducing a liquid crystal material containing liquid crystal molecules and a polymerizable monomer between the first alignment film and the second alignment film, and applying ultraviolet light to the liquid crystal material to polymerize the polymerizable monomer in the liquid crystal material to form a polymer dispersed liquid crystal layer.

13 Claims, 7 Drawing Sheets

(56) References Cited

OTHER PUBLICATIONS

International Search Report and Written Opinion mailed on May 17, 2022, received for PCT Application PCT/JP2022/008867, filed on Mar. 2, 2022, 9 pages including English Translation.

Office Action issued Feb. 14, 2026, in corresponding CN Application No. 202280020848.3, 18pp.

* cited by examiner

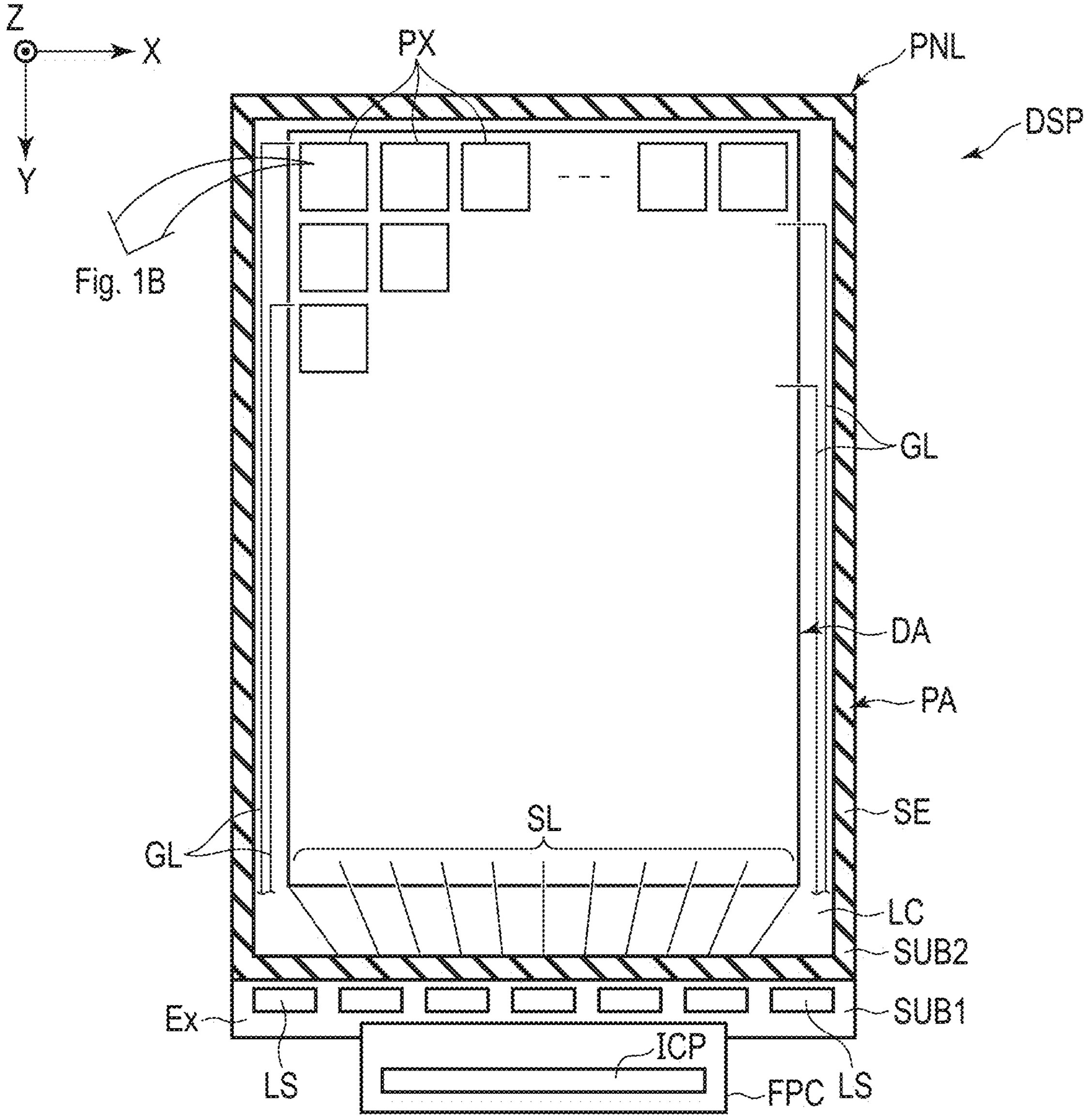
F I G. 1A

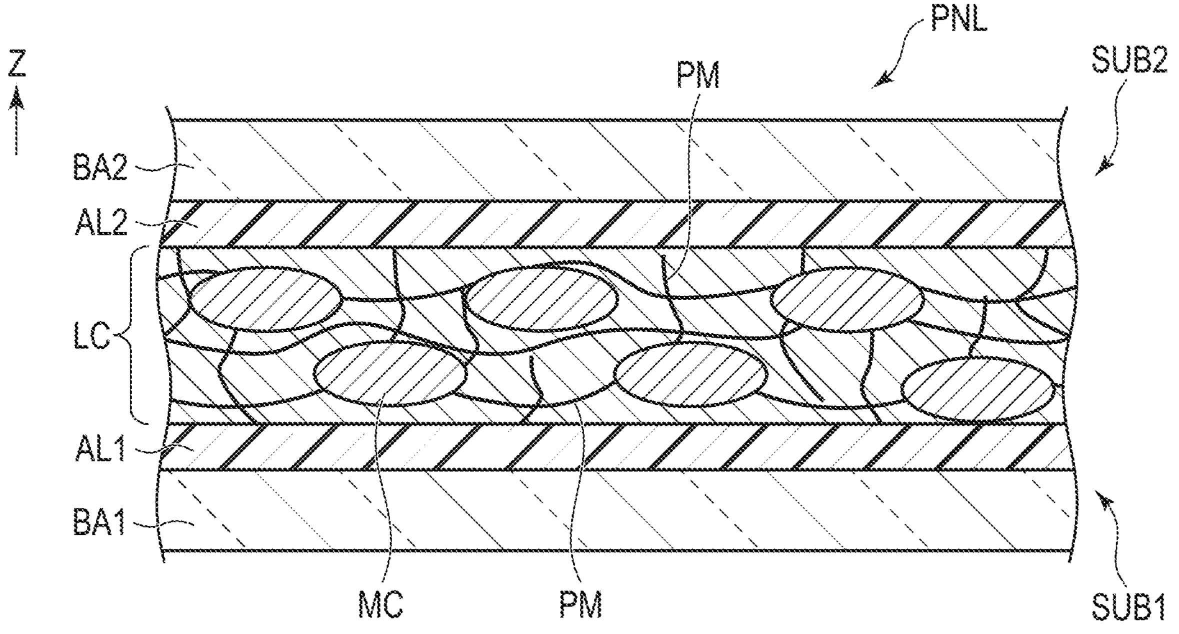
F I G. 3

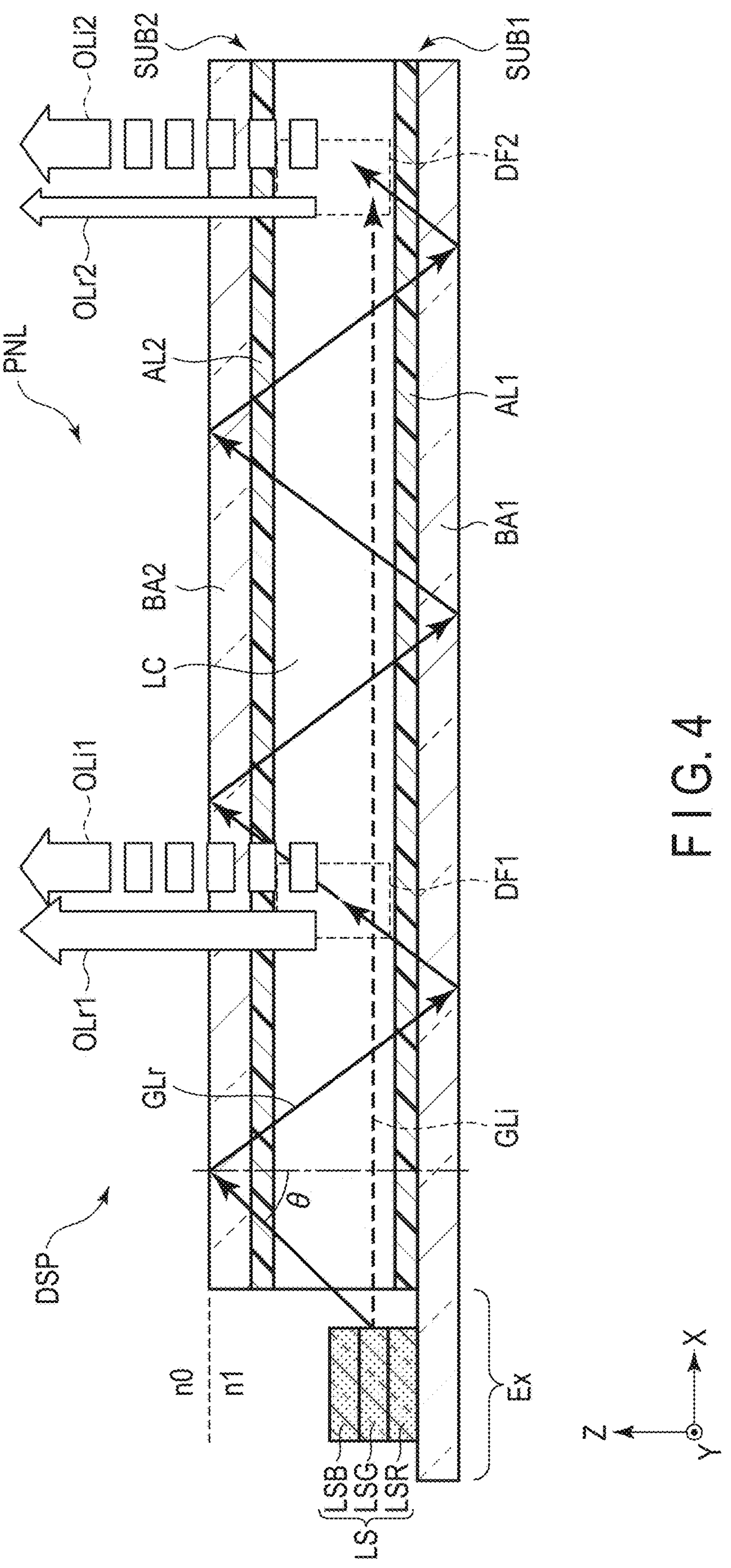
F I G. 4

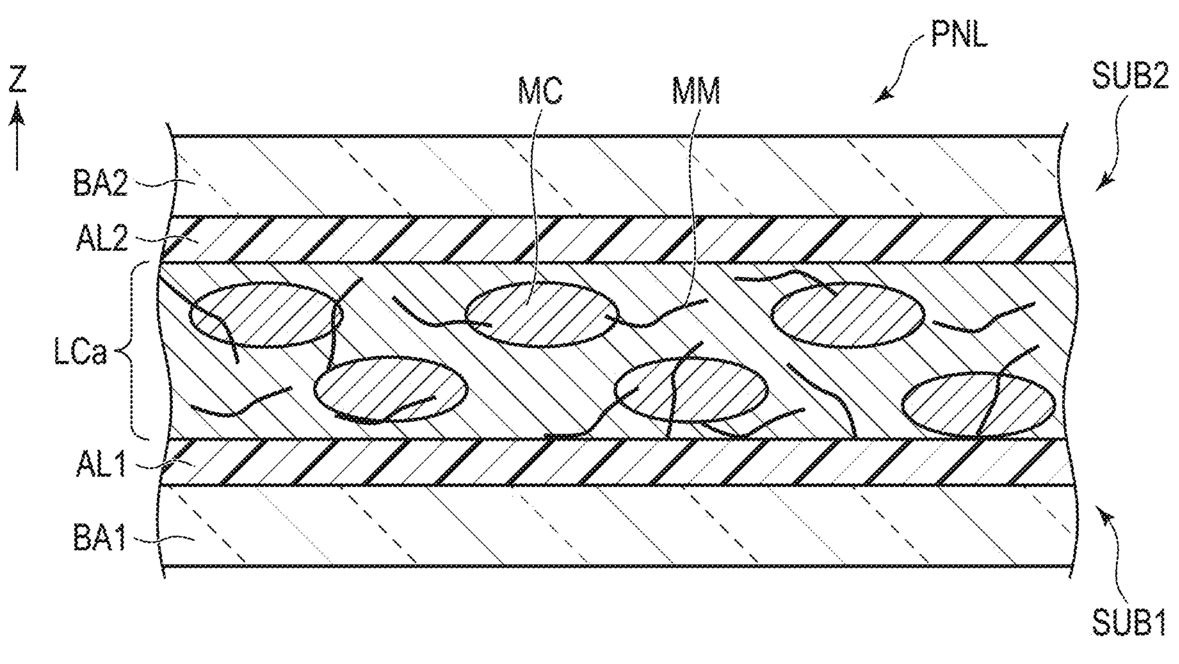
F I G. 7
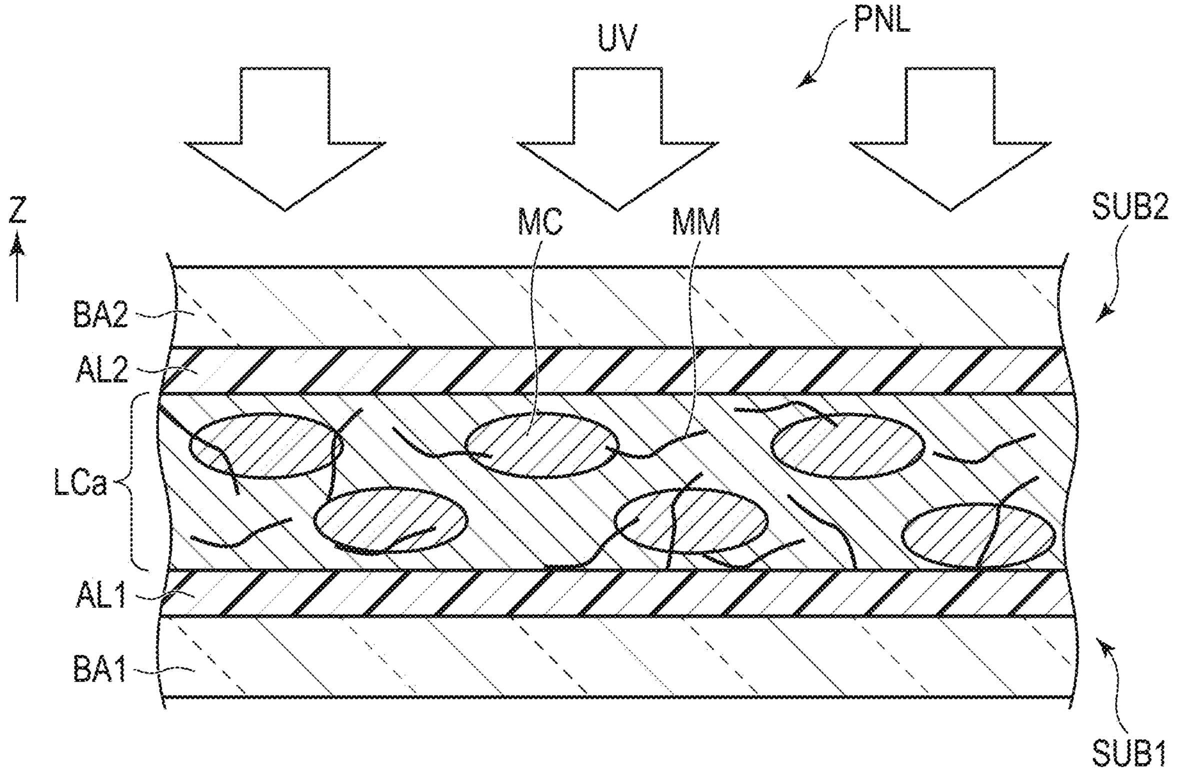
F I G. 8

METHOD OF MANUFACTURING DISPLAY DEVICE

CROSS-REFERENCE TO RELATED APPLICATIONS

This application is a Continuation application of PCT Application No. PCT/JP2022/008867, filed Mar. 2, 2022 and based upon and claiming the benefit of priority from Japanese Patent Application No. 2021-040978 filed Mar. 15, 2021, the entire contents of all of which are incorporated herein by reference.

FIELD

Embodiments described herein relate generally to a method of manufacturing a display device.

BACKGROUND

In recent years, a liquid crystal display device using an alignment film formed by a photo-alignment method has been developed.

In addition, as a liquid crystal display device, a display device of high transparency using a polymer dispersed liquid crystal (PDLC) capable of switching between a scattered state in which incident light is scattered and a transmissive state in which incident light is transmitted, i.e., a so-called transparent display has been developed.

BRIEF DESCRIPTION OF THE DRAWINGS

FIGS. 1A and 1B are plan views illustrating a schematic configuration of a display device according to the present embodiment.

FIG. 3 is a schematic cross-sectional view of the display panel.

FIG. 4 is a schematic cross-sectional view of the display device.

FIG. 7 is a schematic sectional view illustrating a method of manufacturing a display panel.

FIG. 8 is a schematic sectional view illustrating the method of manufacturing the display panel.

Figure 1B:
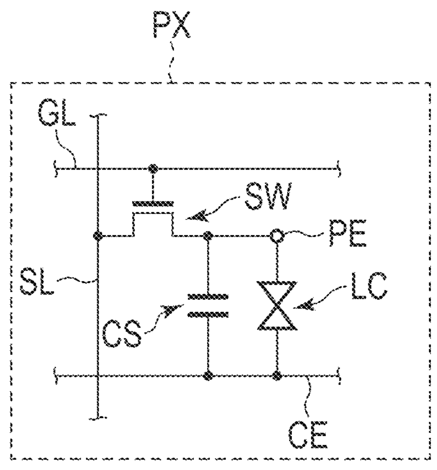

DETAILED DESCRIPTION in general, according to one embodiment, a method of manufacturing a display device, the method comprises applying an alignment film material containing a photolytic component and a non-photolytic component to a surface of a first substrate and a surface of a second substrate;

applying ultraviolet light or visible light to the alignment film material to decompose the photolytic component, thus forming a first alignment film on the first substrate and a second alignment film on the second substrate;

introducing a liquid crystal material containing liquid crystal molecules and a polymerizable monomer between the first alignment film and the second alignment film; and applying ultraviolet light to the liquid crystal material to polymerize the polymerizable monomer in the liquid crystal material to form a polymer containing a polymer chain, thus forming a polymer dispersed liquid crystal layer, wherein the photolytic component contains a first transparent component and a first coloring component, the non-photolytic component includes a second transparent component and a second coloring component, the first transparent component contains a polyamic acid or a polyamic acid ester having a structural unit represented by formula (P1), (P1)

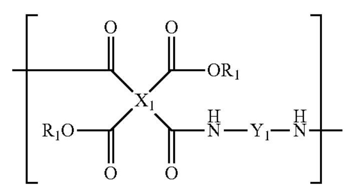

the X1 is any of formulas (X1-1) to (X1-4), (X1-1)

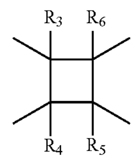

(X1-2)

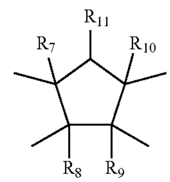

(X1-3)

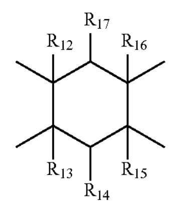

(X1-4)

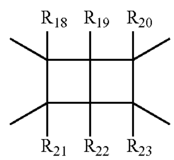

the R1 in the formula (P1) is a hydrogen atom or an alkyl group having 1 to 4 carbon atoms, and the R3 to R23 in the formulas (X1-1) to (X1-4) are each independently a hydrogen atom, a halogen atom, an alkyl group having 1 to 6 carbon atoms, an alkenyl group having 2 to 6 carbon atoms, an alkynyl group having 2 to 6 carbon atoms, a monovalent organic group having 1 to 6 carbon atoms and containing a fluorine atom, or a phenyl group, a content of the photolytic component is 20 mol % or more and less than 50 mol % with respect to 1 mol of all structural units of the alignment film material, the first coloring component contains a polyamic acid or a polyamic acid ester having a structural unit represented by the formula (P1), the Y1 of the formula (P1) of the first coloring component contains a polyamic acid or a polyamic acid ester containing nitrogen, oxygen, fluorine, and chlorine, a content of the first coloring component is less than 10 mol % with respect to 1 mol of all structural units of the alignment film material, the non-decomposition component ND contains a polyamic acid or a polyamic acid ester having a structural unit represented by formula (N1), (N1)

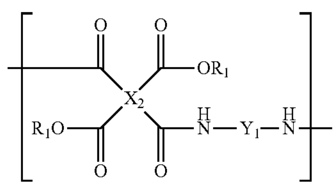

the X2 in formula (N1) is any of formulas (X2-1) to (X2-22),

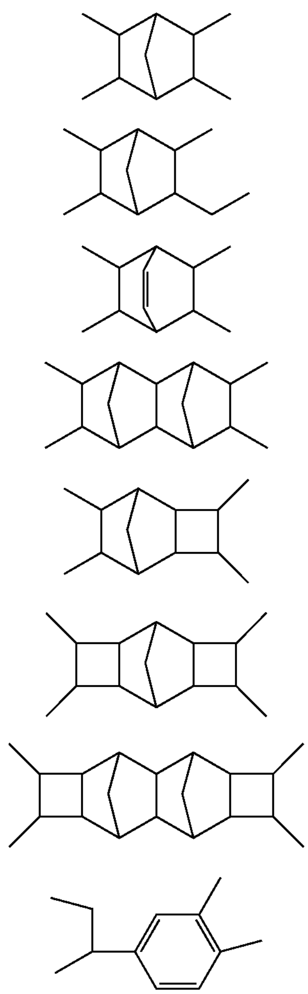

(X2-1)

(X2-2)

(X2-3)

(X2-4)

(X2-5)

(X2-6)

(X2-7)

(X2-8)

-continued (X2-9)

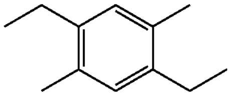

(X2-10)

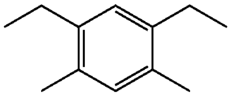

(X2-11)

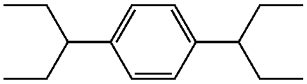

(X2-12)

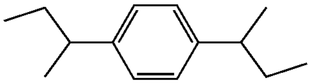

(X2-13)

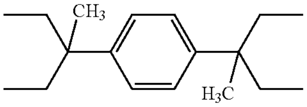

(X2-14)

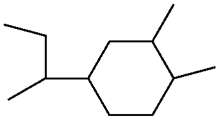

(X2-15)

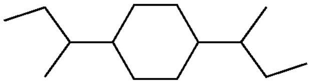

(X2-16)

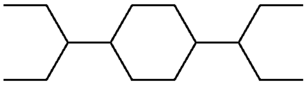

(X2-17)

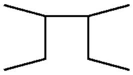

(X2-18)

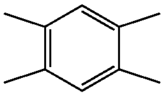

(X2-19)

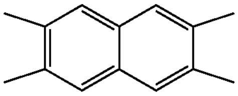

(X2-20)

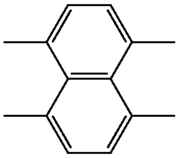

(X2-21)

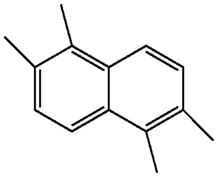

-continued (X2-22)

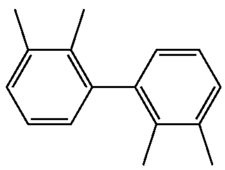

a content of the non-decomposition component is more than 50 mol % and less than 80 mol % with respect to 1 mol of all structural units of the alignment film material, the second coloring component contains a polyamic acid or a polyamic acid ester having the structural unit represented by formula (N1), the Y1 of the formula (N1) of the second coloring component contains nitrogen (N), oxygen (O), fluorine (F), and chlorine (Cl), a content of the second coloring component is 10 mol % or less of the entire alignment film material, the Y1 of the formula (P1) and the Y1 of the formula (N1) are any of formulas (Y1-a1) to (Y1-a2) and formulas (Y1-b1) to (Y1-b81), respectively, and (Y1-a1)

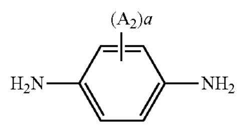

(Y1-a2)

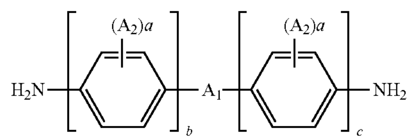

(Y1-b1)

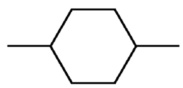

(Y1-b2)

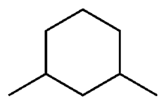

(Y1-b4)

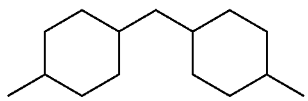

(Y1-b3)

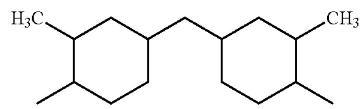

(Y1-b5)

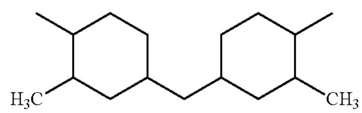

(Y1-b6)

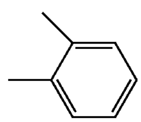

(Y1-b7)

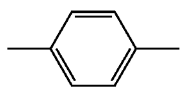

(Y1-b8)

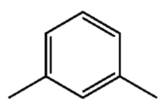

(Y1-b9)

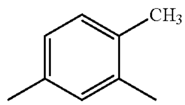

(Y1-b10)

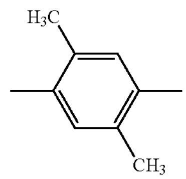

(Y1-b11)

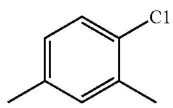

(Y1-b12)

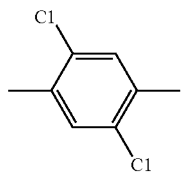

(Y1-b13)

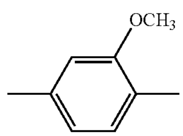

(Y1-b14)

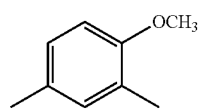

-continued
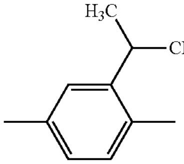
(Y1-b15)
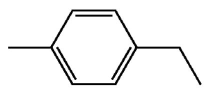
(Y1-b16)
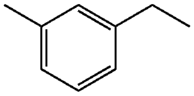
(Y1-b17)
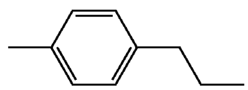
(Y1-b18)
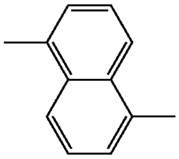
(Y1-b19)
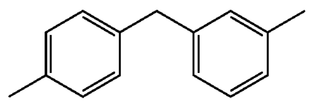
(Y1-b20)
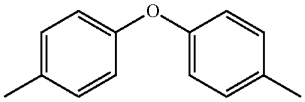
(Y1-b21)
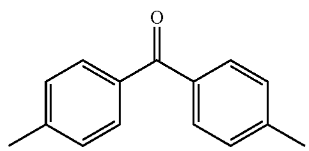
(Y1-b22)
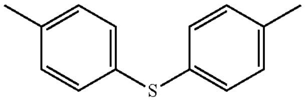
(Y1-b23)
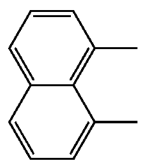
(Y1-b24)
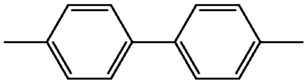
(Y1-b25)
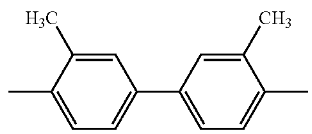
(Y1-b26)
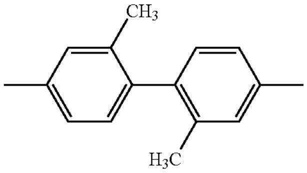
(Y1-b27)
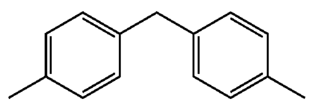
(Y1-b28)
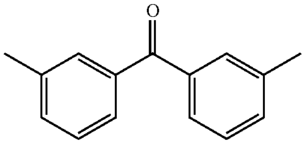
(Y1-b29)
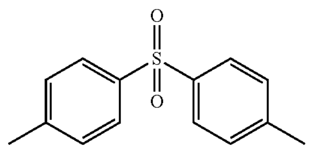
(Y1-b30)
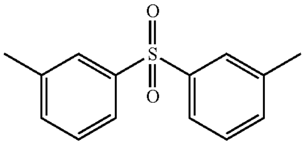
(Y1-b31)
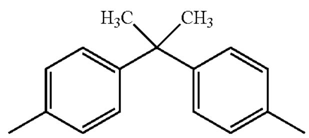
(Y1-b32)
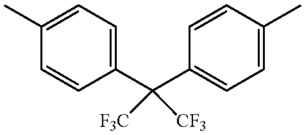
(Y1-b33)
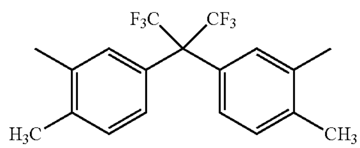
(Y1-b34)

-continued
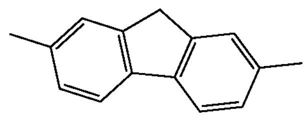
(Y1-b35)
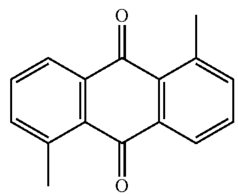
(Y1-b36)
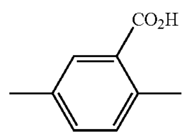
(Y1-b37)
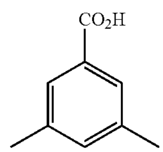
(Y1-b38)
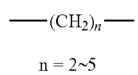
n = 2~5
(Y1-b39)
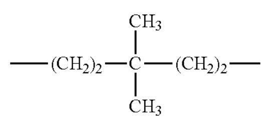
(Y1-b40)
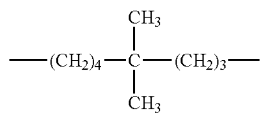
(Y1-b41)
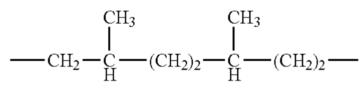
(Y1-b42)
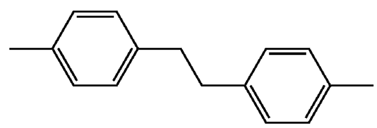
(Y1-b43)
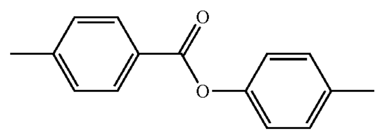
(Y1-b44)
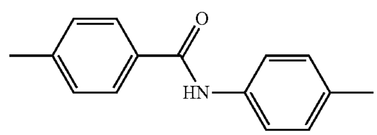
(Y1-b45)
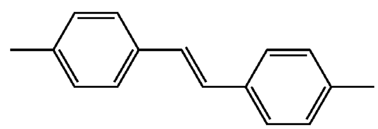
(Y1-b46)
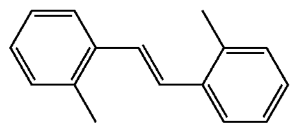
(Y1-b47)
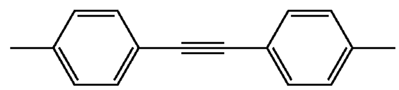
(Y1-b48)
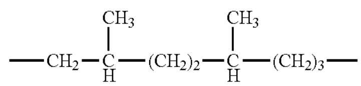
(Y1-b49)
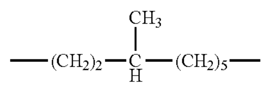
(Y1-b50)
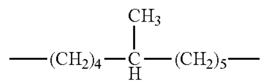
(Y1-b51)
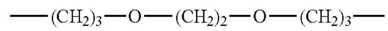
(Y1-b52)
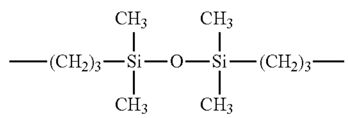
(Y1-b53)
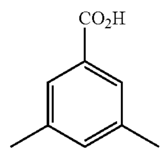
(Y1-b54)
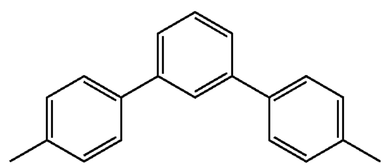
(Y1-b55)
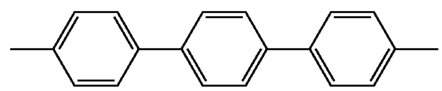
(Y1-b56)

-continued
(Y1-b57)
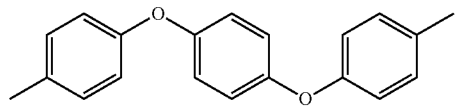
(Y1-b58)
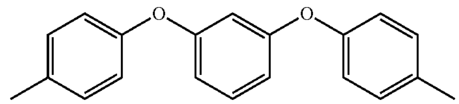
(Y1-b59)
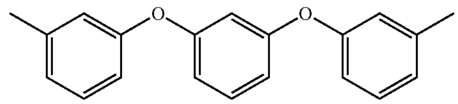
(Y1-b60)
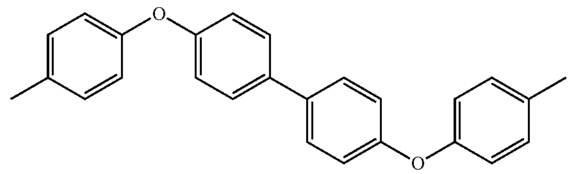
(Y1-b61)
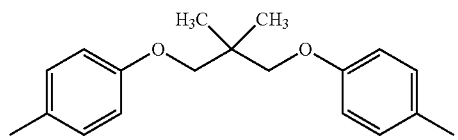
(Y1-b62)
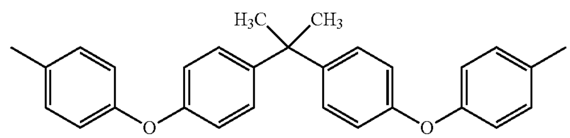
(Y1-b63)
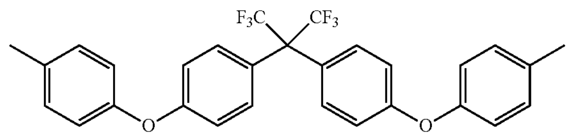
(Y1-b64)
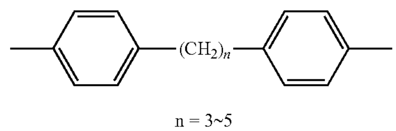
n = 3~5
(Y1-b65)
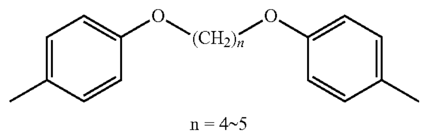
n = 4~5
(Y1-b66)
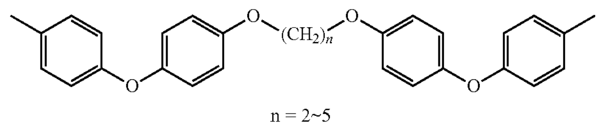
n = 2~5
(Y1-b67)
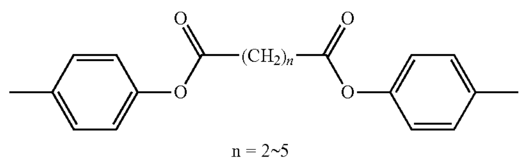
n = 2~5
(Y1-b68)
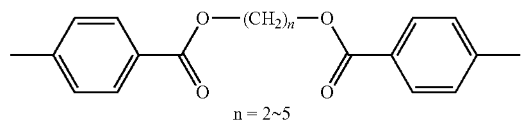
n = 2~5
(Y1-b69)
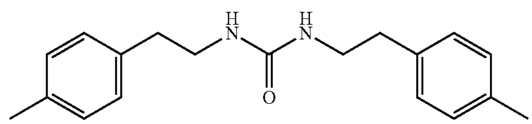
(Y1-b69)
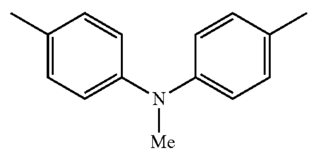
(Y1-b66)
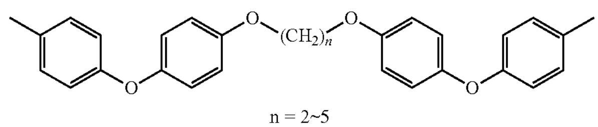
n = 2~5
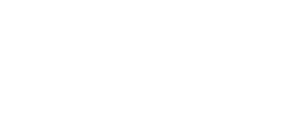
(Y1-b71)
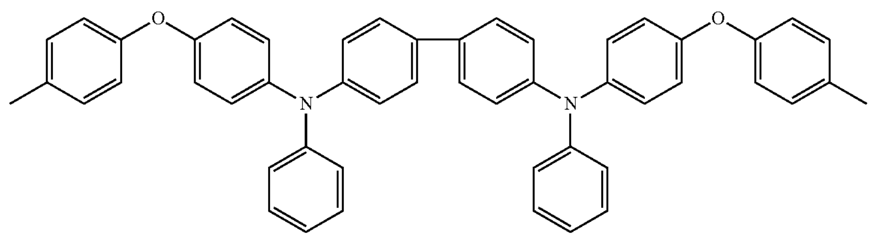

-continued (Y1-b72)

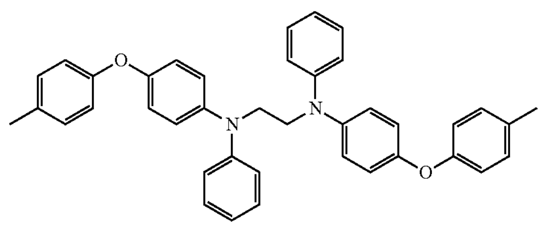

(Y1-b73)

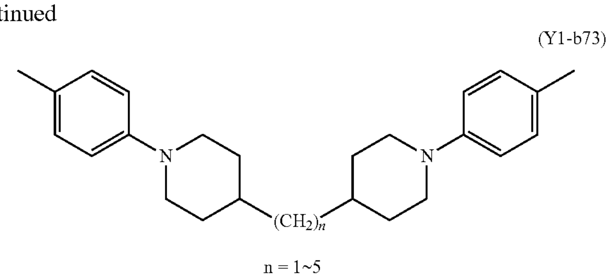

n = 1~5

(Y1-b74)

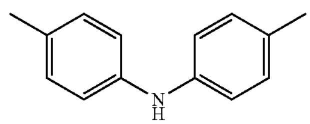

(Y1-b75)

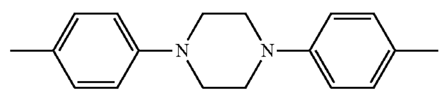

(Y1-b76)

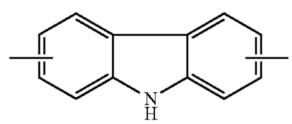

(Y1-b77)

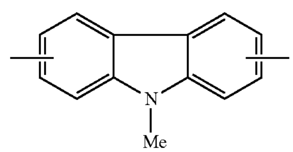

(Y1-b78)

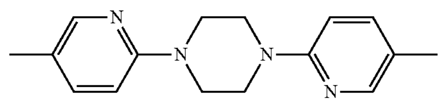

(Y1-b79)

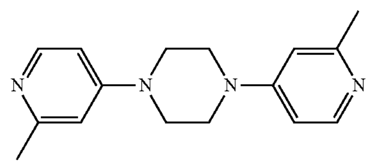

(Y1-b80)

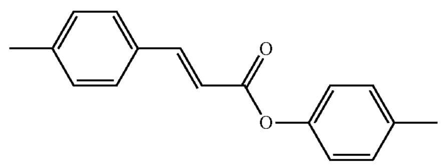

(Y1-b81)

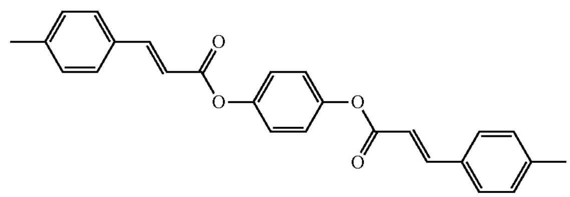

the A1 of the formula (Y1-a2) is a single bond, an ester bond, an amide bond, a thioester bond, or a divalent organic group having 2 to 20 carbon atoms, the A2 of the formula (Y1-a1) and the formula (Y1-a2) is a hydrogen atom, a halogen atom, a hydroxyl group, an amino group, a thiol group, a nitro group, a phosphoric acid group, or a monovalent organic group having 1 to 20 carbon atoms, the a of the formula (Y1-a1) and the formula (Y1-a2) is an integer of 1 to 4, and the b and the c of the formula (Y1-a2) are independently an integer of 1 to 2.

According to one embodiment, a method of manufacturing a display device, comprises applying an alignment film material containing a photolytic component and a non-photolytic component to a surface of a first substrate and a surface of a second substrate;

applying ultraviolet light or visible light to the alignment film material to decompose the photolytic component, thus forming a first alignment film on the first substrate and a second alignment film on the second substrate;

introducing a liquid crystal material containing liquid crystal molecules and a polymerizable monomer between the first alignment film and the second alignment film; and applying ultraviolet light to the liquid crystal material to polymerize the polymerizable monomer in the liquid crystal material to form a polymer containing a polymer chain, thus forming a polymer dispersed liquid crystal layer, wherein the photolytic component contains a first transparent component and a first coloring component, the non-photolytic component includes a second transparent component and a second coloring component, the first transparent component contains a polyamic acid or a polyamic acid ester having a structural unit represented by formula (P1), (P1)

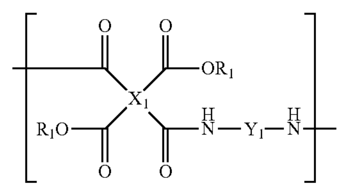

the X1 is any of formulas (X1-1) to (X1-4), (X1-1) (X1-2) (X1-3) (X1-4)

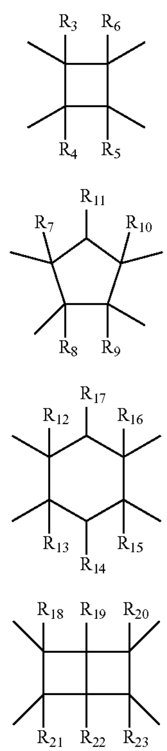

the R1 in the formula (P1) is a hydrogen atom or an alkyl group having 1 to 4 carbon atoms, and the R3 to R23 in the formulas (X1-1) to (X1-4) are each independently a hydrogen atom, a halogen atom, an alkyl group having 1 to 6 carbon atoms, an alkenyl group having 2 to 6 carbon atoms, an alkynyl group having 2 to 6 carbon atoms, a monovalent organic group having 1 to 6 carbon atoms and containing a fluorine atom, or a phenyl group, a content of the photolytic component is 50 mol % or more and 100 mol % or less with respect to 1 mol of all structural units of the alignment film material, the first coloring component contains a polyamic acid or a polyamic acid ester having a structural unit represented by the formula (P1), the Y1 of the formula (P1) of the first coloring component contains a polyamic acid or a polyamic acid ester containing nitrogen, oxygen, fluorine, and chlorine, a content of the first coloring component is less than 10 mol % with respect to 1 mol of all structural units of the alignment film material, the non-decomposition component ND contains a polyamic acid or a polyamic acid ester having a structural unit represented by formula (N1), (N1)

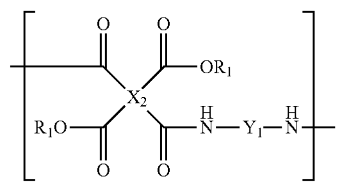

the X2 in the formula (N1) is any of formulas (X2-1) to (X2-22), (X2-1)

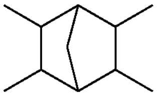

(X2-2)

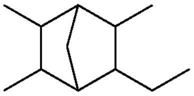

(X2-3)

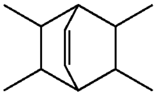

(X2-4)

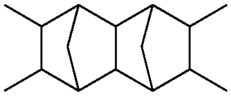

(X2-5)

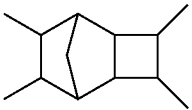

(X2-6)

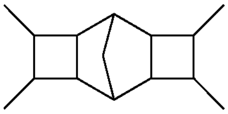

(X2-7)

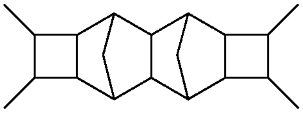

(X2-8)

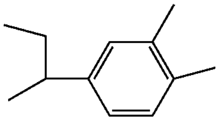

(X2-9)

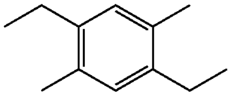

(X2-10)

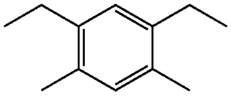

(X2-11)

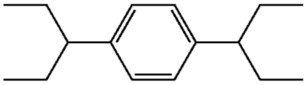

(X2-12)

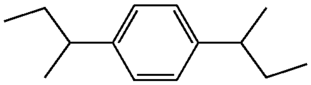

(X2-13)

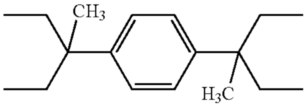

-continued (X2-14)

(X2-15)

(X2-16)

(X2-17)

(X2-18)

(X2-19)

(X2-20)

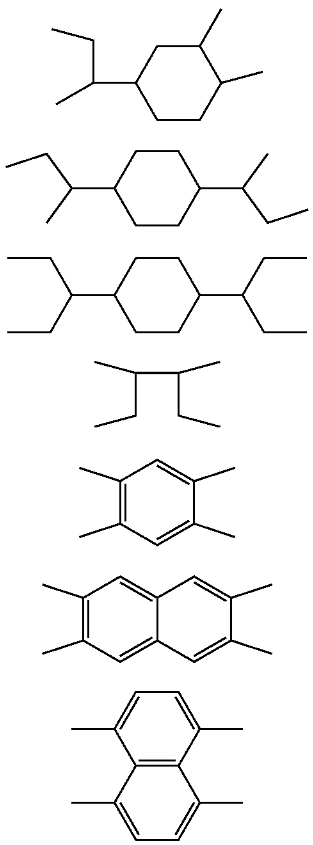

-continued (X2-21)

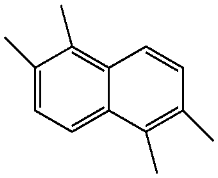

(X2-22)

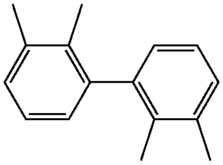

a content of the non-decomposition component is 0 mol % or more and 50 mol % or less with respect to 1 mol of all structural units of the alignment film material, the second coloring component contains a polyamic acid or a polyamic acid ester having the structural unit represented by the formula (N1), the Y1 of the formula (N1) of the second coloring component contains nitrogen (N), oxygen (O), fluorine (F), and chlorine (Cl), a content of the second coloring component is 10 mol % or less of the entire alignment film material, the Y1 of the formula (P1) and the Y1 of the formula (N1) are any of formulas (Y1-a1) to (Y1-a2) and formulas (Y1-b1) to (Y1-b81), respectively, and (Y1-a1)

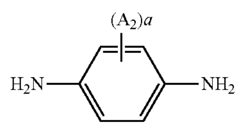

(Y1-a2)

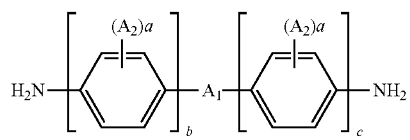

(Y1-b1)

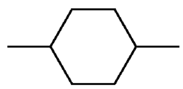

(Y1-b2)

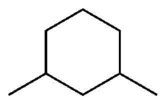

(Y1-b3)

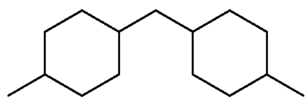

(Y1-b4)

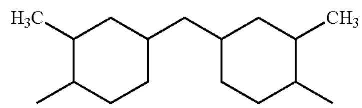

(Y1-b5)

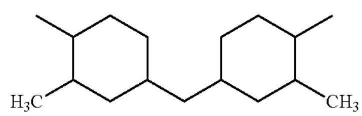

(Y1-b6)

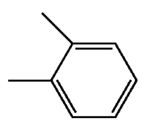

(Y1-b7)

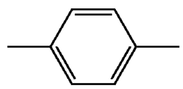

(Y1-b8)

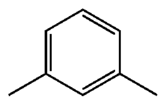

-continued
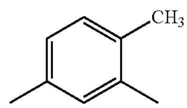
(Y1-b9)
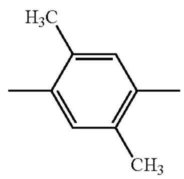
(Y1-b10)
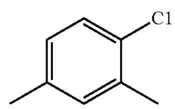
(Y1-b11)
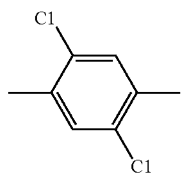
(Y1-b12)
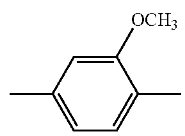
(Y1-b13)
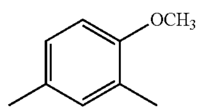
(Y1-b14)
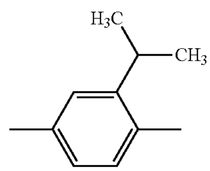
(Y1-b15)
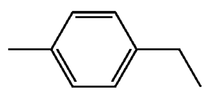
(Y1-b16)
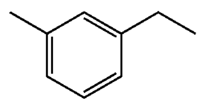
(Y1-b17)
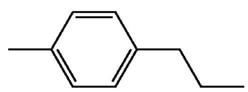
(Y1-b18)
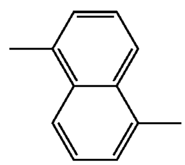
(Y1-b19)
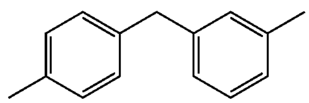
(Y1-b20)
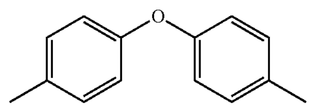
(Y1-b21)
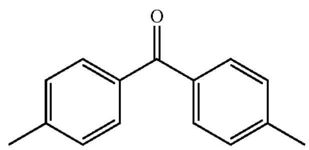
(Y1-b22)
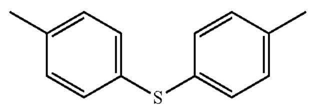
(Y1-b23)
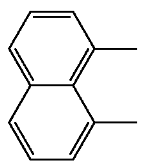
(Y1-b24)
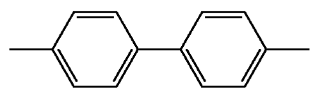
(Y1-b25)
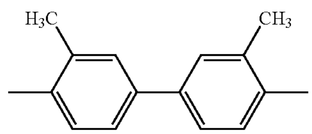
(Y1-b26)
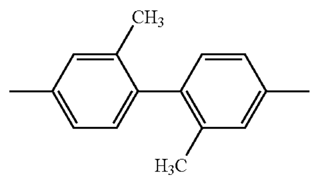
(Y1-b27)
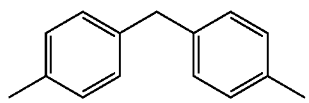
(Y1-b28)

-continued
(Y1-b29)
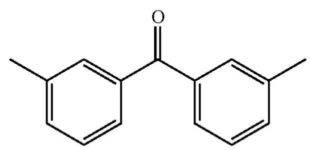
(Y1-b31)
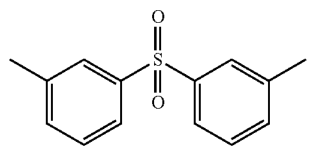
(Y1-b33)
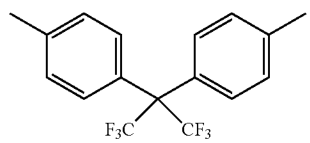
(Y1-b35)
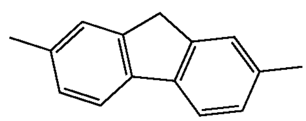
(Y1-b37)
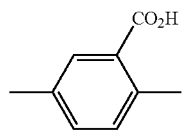
(Y1-b39)
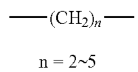
n = 2~5
(Y1-b41)
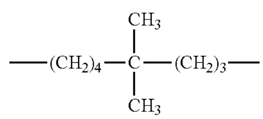
(Y1-b43)
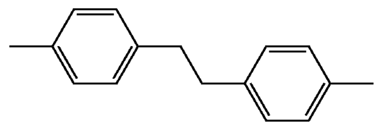
(Y1-b45)
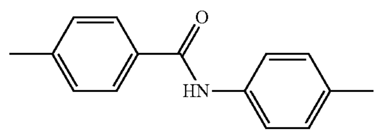
(Y1-b47)
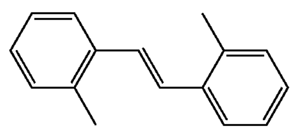
(Y1-b49)
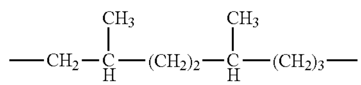
(Y1-b30)
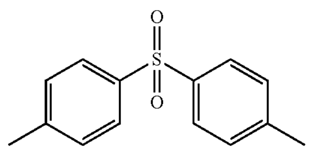
(Y1-b32)
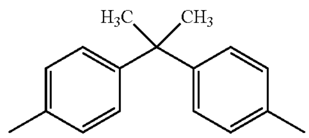
(Y1-b34)
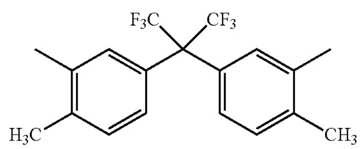
(Y1-b36)
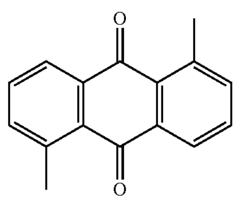
(Y1-b38)
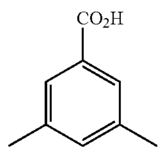
(Y1-b40)
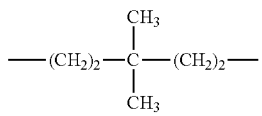
(Y1-b42)
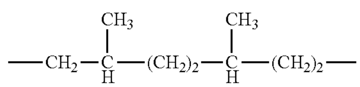
(Y1-b44)
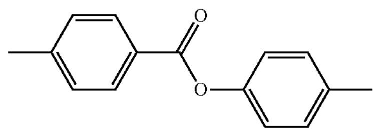
(Y1-b46)
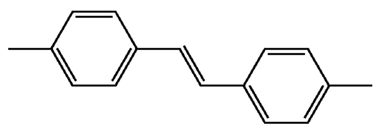
(Y1-b48)
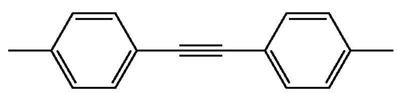
(Y1-b50)
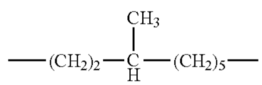

-continued
(Y1-b51)
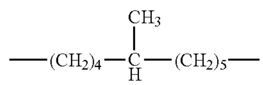
(Y1-b52)
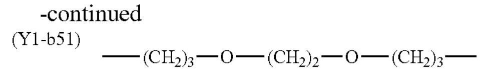
(Y1-b53)
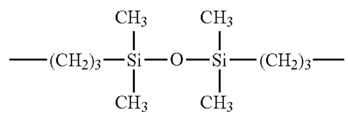
(Y1-b54)
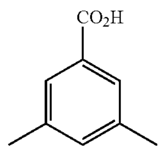
(Y1-b55)
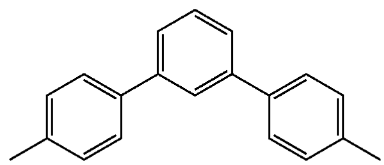
(Y1-b56)
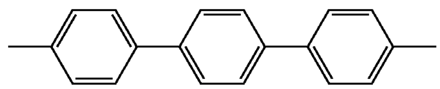
(Y1-b57)
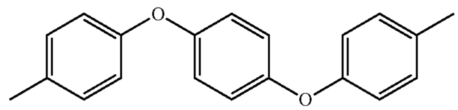
(Y1-b58)
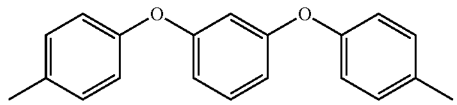
(Y1-b59)
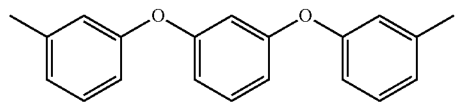
(Y1-b60)
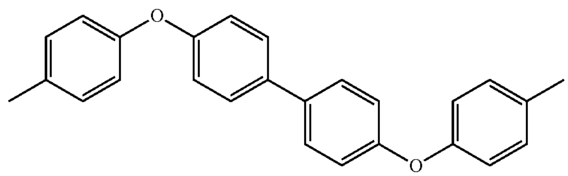
(Y1-b61)
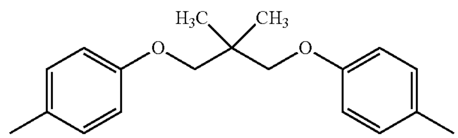
(Y1-b62)
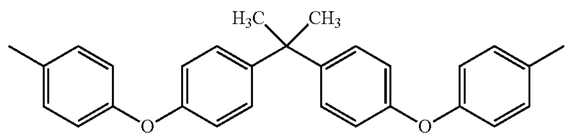
(Y1-b63)
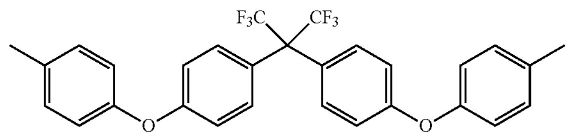
(Y1-b64)
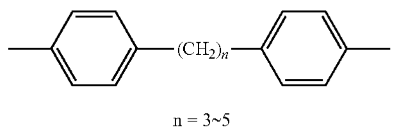
n = 3~5
(Y1-b65)
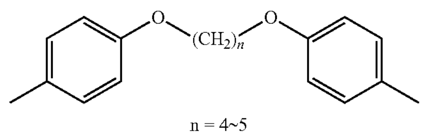
n = 4~5
(Y1-b66)
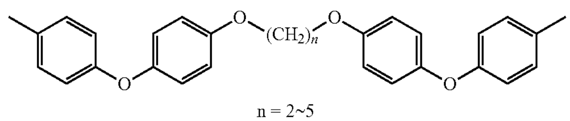
n = 2~5
(Y1-b67)
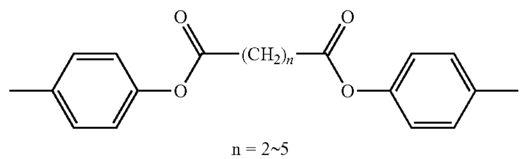
n = 2~5
(Y1-b68)
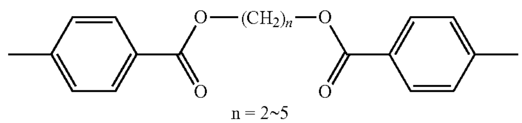
n = 2~5
(Y1-b69)
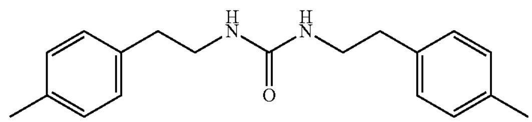
(Y1-b70)
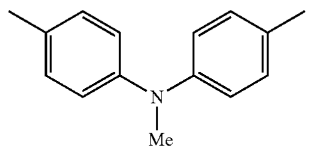

-continued (Y1-b71)

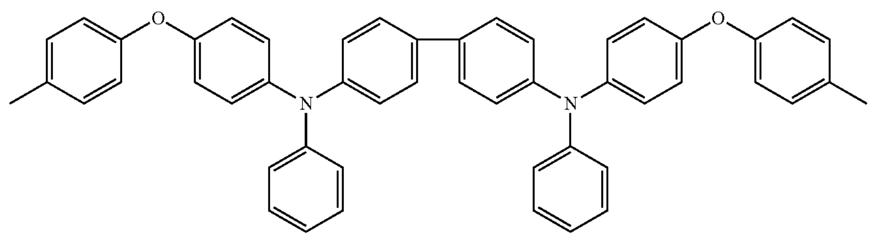

(Y1-b72)

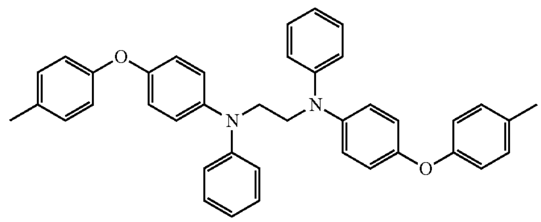

(Y1-b73)

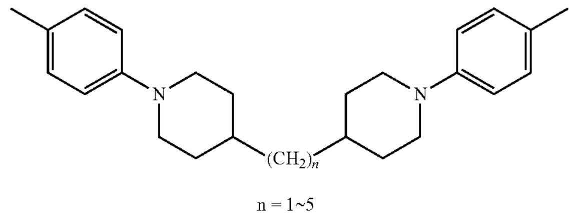

n = 1~5

(Y1-b74)

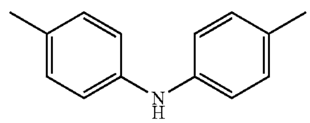

(Y1-b75)

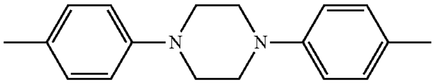

(Y1-b76)

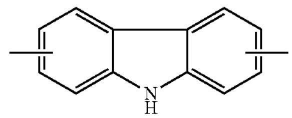

(Y1-b77)

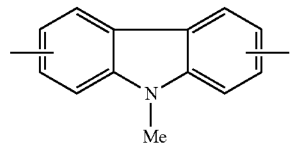

(Y1-b78)

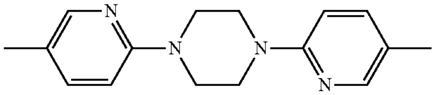

(Y1-b79)

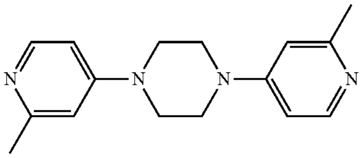

(Y1-b80)

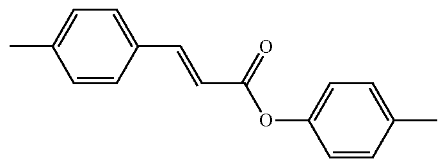

(Y1-b81)

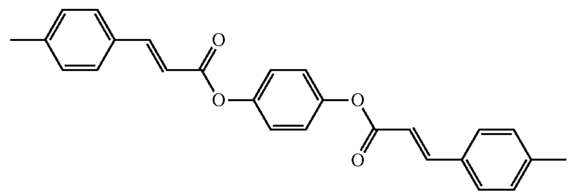

the A1 of the formula (Y1-a2) is a single bond, an ester bond, an amide bond, a thioester bond, or a divalent organic group having 2 to 20 carbon atoms, the A2 of the formula (Y1-a1) and the formula (Y1-a2) is a hydrogen atom, a halogen atom, a hydroxyl group, an amino group, a thiol group, a nitro group, a phosphoric acid group, or a monovalent organic group having 1 to 20 carbon atoms, the a of the formula (Y1-a1) and the formula (Y1-a2) is an integer of 1 to 4, and the b and the c of the formula (Y1-a2) are independently an integer of 1 to 2.

An object of the present embodiment is to provide a method of manufacturing a display device of high transparency and excellent display uniformity.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. The following is a detailed description of one embodiment of a display device with reference to the drawings.

In this embodiment, a first direction X, a second direction Y and a third direction Z are orthogonal to each other, but may intersect at an angle other than 90 degrees. The direction toward the tip of the arrow in the third direction Z is defined as up or above, and the direction opposite to the direction toward the tip of the arrow in the third direction Z is defined as down or below.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the electronic device on a tip side of the arrow in the third direction Z. Here, viewing from this observation position toward the X-Y plane defined by the first direction X and the second direction Y is referred to as plan view. Viewing a cross-section of the liquid crystal device in the X-Z plane defined by the first direction X and the third direction Z or in the Y-Z plane defined by the second direction Y and the third direction Z is referred to as cross-sectional view.

First Embodiment

FIG. 1A and FIG. 1B are plan views illustrating a schematic configuration of a display device according to the present embodiment. FIG. 1A is a plan view illustrating the overall structure of a display device DSP. FIG. 1B is a partially enlarged view of FIG. 1A.

In the present embodiment, the first direction X and the second direction Y correspond to directions parallel to the main surface of a substrate constituting the display device DSP.

In the present embodiment, as the display device DSP, a liquid crystal display device to which a polymer dispersed liquid crystal (PDLC) is applied is disclosed. The display device DSP includes a display panel PNL, a wiring substrate FPC, an IC chip ICP (drive circuit), and a plurality of light sources LS.

The display panel PNL includes a first substrate SUB1 (an array substrate), a second substrate SUB2 (a counter substrate), a liquid crystal layer LC, and a sealant SE. The first substrate SUB1 and the second substrate SUB2 are formed in a flat plate shape parallel to the X-Y plane and opposed to each other in the third direction Z. The sealant SE is formed in a loop shape, for example, and bonds the first substrate SUB1 and the second substrate SUB2 together. The liquid crystal layer LC is disposed between the first substrate SUB1 and the second substrate SUB2, and is sealed by the sealant SE.

The display panel PNL has a display area DA in which an image is displayed and a peripheral area PA in a frame shape surrounding the display area DA. The sealant SE is disposed in the peripheral area PA. The display area DA includes a plurality of pixels PX arranged in a matrix in the first direction X and the second direction Y.

As illustrated in FIG. 1B, the pixels PX each include a switching element SW, a pixel electrode PE, and a common electrode CE. The switching element SW includes, for example, a thin-film transistor (TFT), and is electrically connected to a scanning line GL and a signal line SL. The scanning line GL is electrically connected to the switching element SW in each of the pixels PX arranged in the first direction X. The signal line SL is electrically connected to the switching element SW in each of the pixels PX arranged in the second direction Y. The pixel electrode PE is electrically connected to the switching element SW. The common electrode CE is provided in common for a plurality of pixel electrodes PE. The liquid crystal layer LC is driven by an electric field generated across the pixel electrode PE and the common electrode CE. A capacitance CS is formed, for example, between an electrode having the same electric potential as the common electrode CE and an electrode having the same electric potential as the pixel electrode PE.

The scanning line GL, the signal line SL, the switching element SW, and the pixel electrode PE are provided on the first substrate SUB1, and the common electrode CE is provided on the second substrate SUB2. The scanning line GL extends to the peripheral area PA and is electrically connected to the wiring substrate FPC or the IC chip ICP. The signal line SL extends to the peripheral area PA and is electrically connected to the wiring substrate FPC or the IC chip ICP.

The wiring substrate FPC is electrically connected to terminals disposed in the extended portion Ex of the first substrate SUB1. The extended portion Ex corresponds to a portion of the first substrate SUB1 that is not opposed to the second substrate SUB2. For example, the wiring substrate FPC is a flexible printed circuit board. The IC chip ICP is mounted on the wiring substrate FPC. The IC chip ICP incorporates, for example, a display driver that outputs a signal necessary for image display. Note that the IC chip ICP may be mounted on the extended portion Ex.

The plurality of light sources LS is superposed on the extended portion Ex. These light sources LS are arranged and spaced apart from each other along the first direction X. The light sources LS each include, for example, a light emitting element that emits red (R) light, a light emitting element that emits green (G) light, and a light emitting element that emits blue (B) light. As these light emitting elements, although light-emitting diodes (LED) can be used, for example, the light emitting elements are not limited to this example.

Figure 2:
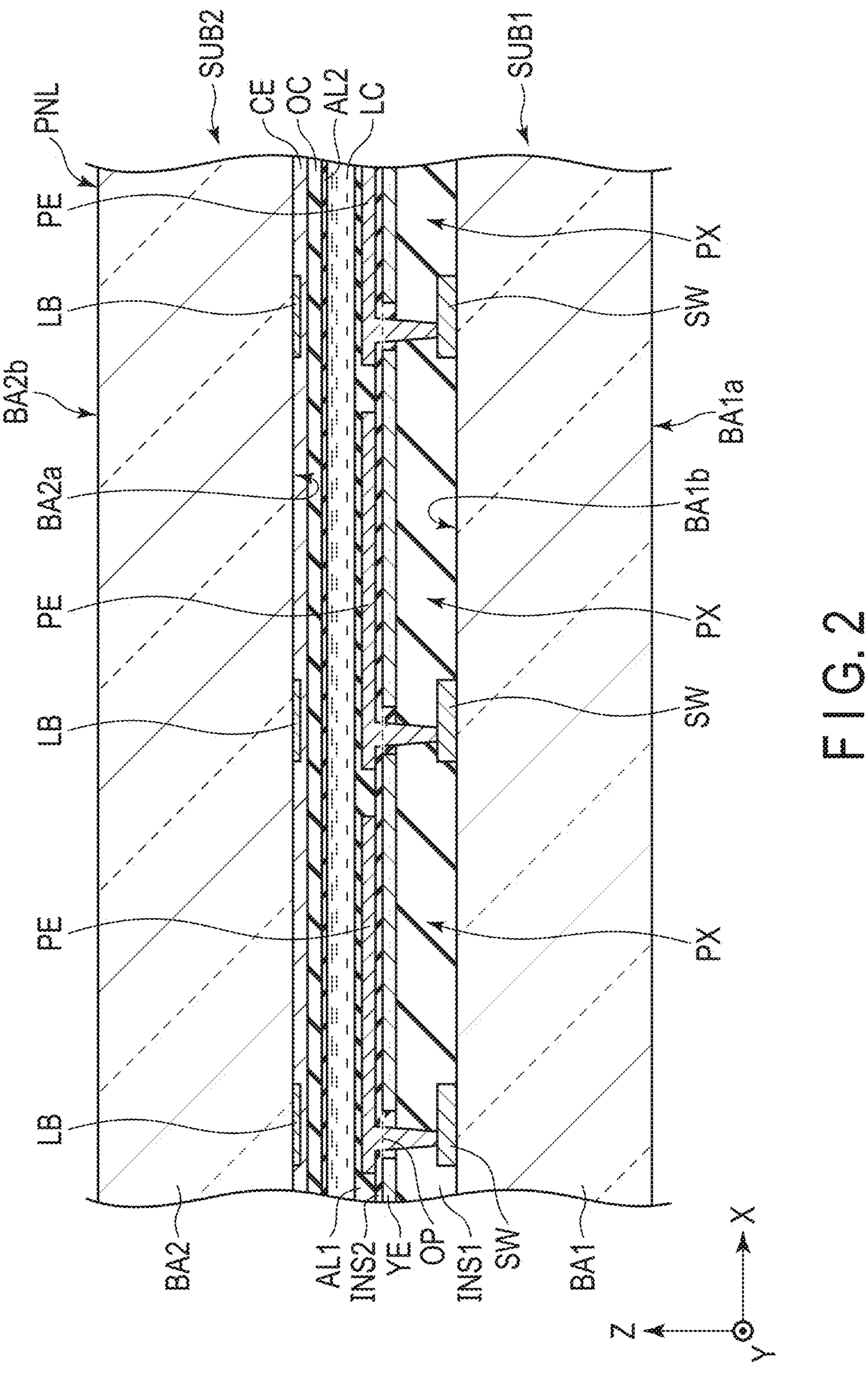
FIG. 2 is a cross-sectional view illustrating an example of a configuration applicable to a display panel illustrated in FIGS. 1A and 1B.

FIG. 2 is a cross-sectional view illustrating an example of a configuration applicable to the display panel PNL illustrated in FIGS. 1A and 1B. The first substrate SUB1 includes a base BA1, an insulating layer INS1 and an insulating layer INS2, a capacitive electrode YE, an alignment film AL1, a switching element SW, and a pixel electrode PE. The base BA1 has a first surface BA1*a* and a second surface BA1*b* opposite to the first surface BA1*a*.

The switching element SW is disposed on the second surface BA1*b* side. The insulating layer INS1 covers the switching element SW. Although the switching element SW is simplified in FIG. 2, the switching element SW actually includes a semiconductor layer and various electrodes. In addition, the scanning lines GL and the signal lines SL illustrated in FIGS. 1A and 1B are disposed between the base BA1 and the insulating layer INS1, and are not illustrated in FIG. 2. The capacitive electrode YE is disposed between the insulating layers INS1 and INS2. The pixel electrode PE is disposed for each pixel PX between the insulating layer INS2 and the alignment film AL1. The pixel electrode PE is electrically connected to the switching element SW through the opening portion OP of the capacitive electrode YE. The pixel electrode PE is opposed to the capacitive electrode YE and forms the above-described capacitance CS. The alignment film AL1 covers the pixel electrode PE.

The second substrate SUB2 includes a base BA2, a light-shielding layer LB, an overcoat layer (insulating layer) OC, an alignment film AL2, and the common electrode CE. The base BA2 has a first surface BA2*a* opposed to the first substrate SUB1 and a second surface BA2*b* opposite to the first surface BA2*a*.

In the present disclosure, the base BA1 and the base BA2 are also referred to as a first base and a second base, respectively. The alignment film AL1 and the alignment film AL2 are also referred to as a first alignment film and a second alignment film, respectively.

The light-shielding layer LB and the common electrode CE are disposed on the first surface BA2*a* side. For example, the light-shielding layer LB is opposed to the switching element SW, the scanning line GL, and the signal line SL. The common electrode CE is disposed across the plurality of pixels PX and is opposed to the plurality of pixel electrodes PE in the third direction Z. In addition, the common electrode CE covers the light-shielding layer LB. The common electrode CE has the same electric potential as the capacitive electrode YE. The overcoat layer OC covers the common electrode CE. The alignment film AL2 covers the overcoat layer OC. The liquid crystal layer LC is disposed between the alignment film AL1 and the alignment film AL2, and is in contact with the alignment film AL1 and the alignment film AL2.

The base BA1 and the base BA2 are transparent insulating bases, e.g., a glass substrate and a plastic substrate. The insulating layer INS1 is made of a transparent insulating material, e.g., silicon oxide, silicon nitride, silicon oxynitride, or acrylic resin. For example, the insulating layer INS1 includes an inorganic insulating film and an organic insulating film. The insulating layer INS2 is, for example, an inorganic insulating film such as silicon nitride. The capacitive electrode YE, the pixel electrode PE, and the common electrode CE are transparent electrodes formed of a transparent conductive material, e.g., indium tin oxide (ITO) or indium zinc oxide (IZO). The details of the alignment film AL1 and the alignment film AL2 will be described later.

Note that the configuration of the display panel PNL is not limited to the examples of FIGS. 1A, 1B, and 2. For example, the first substrate SUB1 does not necessarily include the capacitive electrode YE. The second substrate SUB2 does not necessarily include the light-shielding layer LB.

FIG. 3 is a schematic cross-sectional view of the display panel. The display panel PNL includes the liquid crystal layer LC. In the present embodiment, the liquid crystal layer LC has a polymer PM containing a polymer chain and liquid crystal molecules MC. The liquid crystal molecules MC are dispersed in the gap of the polymer PM. A method of manufacturing the liquid crystal layer LC will be described in detail later.

The polymer PM and the liquid crystal molecules MC have optical anisotropy or refractive anisotropy. The responsiveness of the polymer PM to the electric field is lower than the responsiveness of the liquid crystal molecules MC to the electric field. For example, the alignment direction of the polymer PM hardly changes regardless of the electric field between the pixel electrode PE and the common electrode CE. On the other hand, the alignment direction of the liquid crystal molecules MC changes according to the electric field.

In a state in which no electric field acts on the liquid crystal layer LC or the electric field is extremely weak, the optical axes of the polymer PM and the liquid crystal molecules MC are substantially parallel to each other. The refractive indexes of the liquid crystal molecules MC and the polymer PM are substantially equal to each other. In other words, the refractive index difference between the liquid crystal molecules MC and the polymer PM is substantially eliminated. Therefore, the light incident on the liquid crystal layer LC is transmitted with little scattering in the liquid crystal layer LC. In the following, such a state is referred to as a transparent state. In addition, the voltage of the pixel electrode PE that achieves the transparent state is referred to as a transparent voltage. The transparent voltage may be the same as or slightly different from the common voltage applied to the common electrode CE.

On the other hand, in a state in which a sufficient electric field acts on the liquid crystal layer LC, the optical axes of the polymer PM and the liquid crystal molecules MC intersect with each other. Therefore, the light incident on the liquid crystal layer LC is scattered in the liquid crystal layer LC. In the following, such a state is referred to as a scattered state. In addition, the voltage of the pixel electrode PE that achieves the scattered state is referred to as a scattering voltage. The scattering voltage is such a voltage that the electric potential difference from the common electrode CE becomes larger than the transparent voltage.

FIG. 4 is a schematic cross-sectional view of the display device. The light source LS includes a red (R) light source LSR, a green (G) light source LSG, and a blue (B) light source LSB.

The light source LS is disposed in extended portion Ex and is opposed to the side surface of the second substrate SUB2. However, the light source LS may be disposed in a portion other than the extended portion Ex. In addition, the light source LS may be opposed to the side surface of the first substrate SUB1, or may be opposed to the side surface of the first substrate SUB1 and the side surface of the second substrate SUB2.

As illustrated in FIG. 4, light GLr emitted from the light source LS is incident on the side surface of the display panel PNL, and guided between the first substrate SUB1 and the second substrate SUB2 while repeating total reflection.

In the vicinity of the pixel electrode PE to which the transparent voltage is applied, the light GLr is hardly scattered by the liquid crystal layer LC. For this reason, the light GLr hardly leaks from the first substrate SUB1 and the second substrate SUB2.

On the other hand, in the vicinity of the pixel electrode PE to which the scattering voltage is applied (referred to as a scattering area DF), the light GLr is scattered by the liquid crystal layer LC. This scattered light OLr is emitted from the first substrate SUB1 and the second substrate SUB2, and is visually recognized as a display image. By defining the scattering voltage stepwise within a predetermined range, it is also possible to realize the half-toning of the degree of scattering (luminance).

Note that in the vicinity of the pixel electrode PE to which the transparent voltage is applied, the external light incident on the first substrate SUB1 or the second substrate SUB2 passes through these substrates with little scattering. That is, the background on the first substrate SUB1 side can be visually recognized when the display panel PNL is viewed from the second substrate SUB2 side, and the background on the second substrate SUB2 side can be visually recognized when the display panel PNL is viewed from the first substrate SUB1 side. The display device DSP including such a display panel PNL can be said to be a transparent display.

In the display device DSP of the present embodiment, the transparent state can be realized by substantially matching the refractive indexes of the polymer PM and the liquid crystal molecules MC. For this purpose, the initial alignment of the liquid crystal molecules MC has to be uniaxially aligned. In order to uniaxially align the liquid crystal molecules MC, the alignment film AL1 and the alignment film AL2 are provided on each of the first substrate SUB1 and the second substrate SUB2.

However, the alignment film AL1 and the alignment film AL2 absorb a part of the light GLr guided between the substrates. The light GLr passes through the alignment film AL1 and the alignment film AL2 a plurality of times during light guiding. A part of the light GLr is absorbed every time when the light GLr passes through the alignment film AL1 and the alignment film AL2. For this reason, as the distance from the light source LS increases, the transmittance decreases, and there is a possibility that a decrease in luminance and a color shift increase. Therefore, there is a possibility that the display of the display device DSP becomes non-uniform.

In FIG. 4, the scattered light emitted from a scattering area DF1 close to the light source LS is referred to as scattered light OLr1, and the scattered light emitted from a scattering area DF2 farther from the light source LS than the scattering area DF1 is referred to as scattered light OLr2. The luminance of the scattered light OLr2 is lower than the luminance of the scattered light OLr1.

In addition, since the ease of absorption varies depending on the wavelength of light, a color shift may occur as the distance from the light source LS increases. For example, blue light having a short wavelength is easily absorbed. As apart from the light source LS, the blue light of the light GLr is absorbed, and as a result, the scattered light OLr may appear yellow.

The change in transmittance with respect to the number of times at which the light GLr passes through the alignment film will be described. The critical angle θ at which the light GLr passes through the base having a thickness of 1 mm is 42 degrees. The base corresponds to the base BA2 that occupies most of the thickness of the second substrate SUB2.

The light GLr is reflected and guided by the interface between the base BA2 and air. The refractive index n1 of the base BA2 and the refractive index n0 of air are 1.5 and 1.0, respectively.

The number of times of reflections, the number of times of transmissions, and the transmittance at distances of 110 mm and 660 mm from the end portion on the incident side of the base BA2 were 122 times and 733 times, 244 times and 1,466 times, and 78.3% and 23.1%, respectively.

As described above, as the distance from the end portion on the incident side increases, the number of times of reflections and the number of times of transmissions increase. On the other hand, as the distance from the end portion on the incident side increases, the transmittance decreases. Specifically, it has been found that the transmittance decreases to about ⅓ of the distance of 110 mm at the distance of 660 mm from the end portion on the incident side.

When the distance from the end portion on the incident side is regarded as the size of the display panel PNL, the transmittance decreases as the display panel PNL increases. Therefore, the luminance of the scattered light decreases.

In FIG. 4, light that is guided without passing through the alignment film AL1 and the alignment film AL2 is assumed to be light GLi. Scattered light OLi1 emitted from the scattering area DF1 and scattered light OLi2 emitted from the scattering area DF2 have the same luminance. This is because a part of the light GLi is not absorbed because the light does not pass through the alignment film AL1 and the alignment film AL2.

Comparing the scattered light OLr2 with the scattered light OLi2 emitted in the scattering area DF2 far from the light source LS, as described above, the luminance of the scattered light OLi2 is higher than the luminance of the scattered light OLr2.

Figure 5:
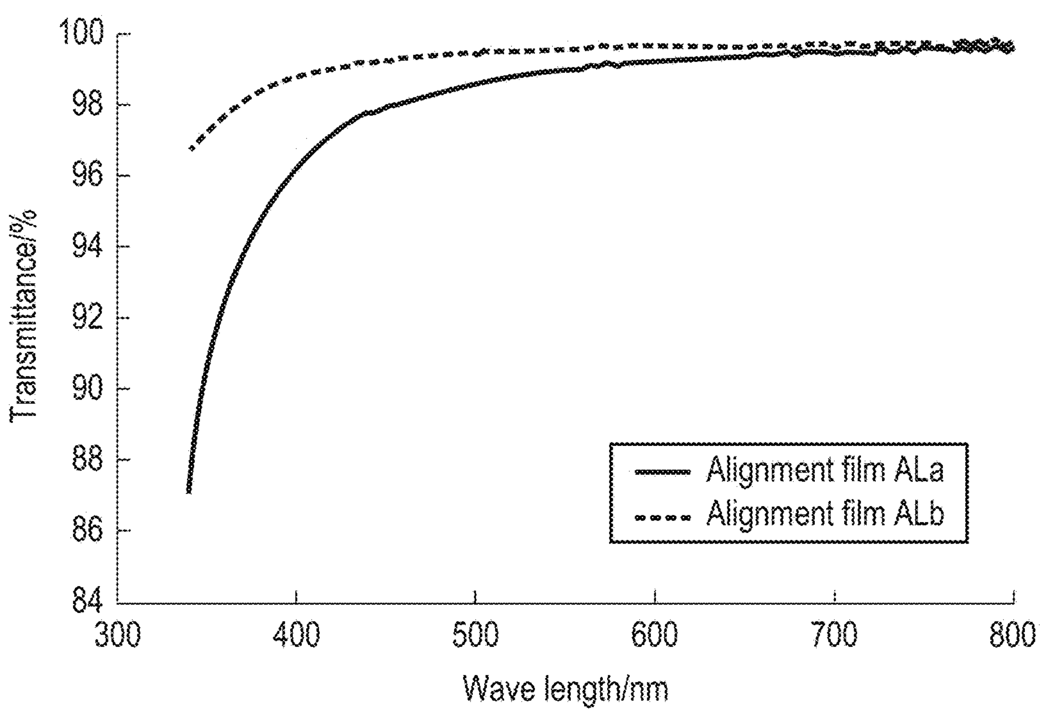
FIG. 5 is a view illustrating the spectral transmittance of the alignment films with respect to the wavelength.

FIG. 5 is a view illustrating the spectral transmittance of alignment films with respect to the wavelength. In the present embodiment, the spectral transmittance with respect to the wavelength will be described using two different alignment films ALa and ALb.

For example, the transmittance of the alignment film ALa is 98% or more at a wavelength of light of 450 nm or more. However, the transmittance decreases at a wavelength of 450 nm or less, and for example, the transmittance decreases to 87% near a wavelength of 340 nm.

On the other hand, the alignment film ALb maintains a transmittance of 98% or more at a wavelength of light of 370 nm or more, for example. Further, even though the wavelength is 370 nm or less, the transmittance is about 97%.

A case of using an alignment film whose transmittance decreases in a low wavelength range, such as the alignment film ALa, will be considered. As described above, the low-wavelength component of the guided light is absorbed every time when the light passes through the alignment film ALa. In an area where the number of times of transmission through the alignment film ALa is large, i.e., in an area far from the light source LS, the low-wavelength component, for example, the blue component decreases. As a result, the color shift of the scattered light OLr increases.

In the alignment film ALb in which the transmittance is maintained in the low wavelength range, the component of light absorbed even through the alignment film ALa is small. When the alignment film ALb having high transmittance even in the low wavelength range is used in the display device DSP, it is possible to suppress the color shift.

Figure 6:
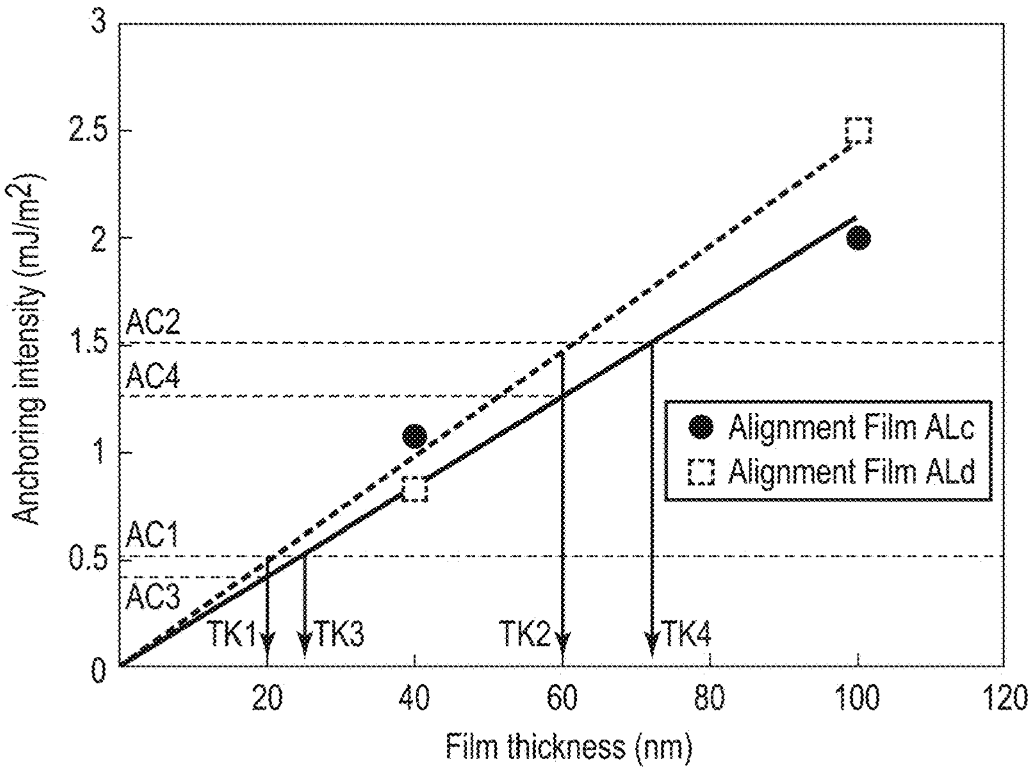
FIG. 6 is a view illustrating anchoring intensity with respect to the film thicknesses of the alignment films.

Here, the relationship between the film thickness of the alignment film and the anchoring intensity will be described. FIG. 6 is a view illustrating the anchoring intensity with respect to the film thickness of the alignment film. In the display device DSP having the PDLC as the liquid crystal layer LC, it is possible to use an alignment film having a smaller film thickness as compared with a display device having a liquid crystal layer different from the PDLC. In the present embodiment, in order to make the notation easy to understand, a display device using the PDLC is referred to as a PDLC display device, and a display device having a liquid crystal layer different from the PDLC is simply referred to as a liquid crystal display device.

In FIG. 6, the lower limit value of the anchoring intensity that enables normal initial alignment of the liquid crystal layer LC, which is the PDLC, is set as anchoring intensity AC1, and the lower limit value of the anchoring intensity necessary for the liquid crystal layer, which is not the PDLC, is set as anchoring intensity AC2. In the present embodiment, the anchoring intensity refers to a force (alignment restriction force) by which the alignment film aligns the liquid crystal molecules. The lower limit value of the anchoring intensity indicates the minimum value at which the liquid crystal molecules can return to the initial alignment when the applied electric field is turned off.

Here, the anchoring intensity with respect to the film thickness will be described using two different alignment films ALc and ALd.

In the alignment film ALd, a film thickness TK1 at the anchoring intensity AC1 (specifically, 0.5 mJ/$m^2$) is 20 nm. In the alignment film ALd, a film thickness TK2 at the anchoring intensity AC2 (specifically, 1.5 mJ/$m^2$) is 60 nm.

In the alignment film ALc, a film thickness TK3 at the anchoring intensity AC1 is 25 nm. In the alignment film ALc, a film thickness TK4 at the anchoring intensity AC2 is 72 nm.

When the film thickness is 20 nm, the anchoring intensity AC1 of the alignment film ALd is 0.5 mJ/$m^2$. Similarly, the anchoring intensity AC3 of the alignment film ALc is 0.4 mJ/$m^2$.

When the film thickness is 60 nm, the anchoring intensity AC2 of the alignment film ALd is 1.5 mJ/$m^2$. Similarly, the anchoring intensity AC4 of the alignment film ALc is 1.3 mJ/$m^2$.

In the liquid crystal display device, an alignment film having an anchoring intensity of less than 1.5 mJ/$m^2$ (anchoring intensity AC2 or less) can align the liquid crystal molecules MC in the initial state. However, when the electric field is turned on and off to switch the liquid crystal molecules MC, the liquid crystal molecules MC do not return to the initial alignment when the electric field is turned off. When the liquid crystal molecules MC do not return to the initial alignment, there is a possibility that screen image sticking occurs and this causes a difficulty of retaining normal display quality.

In other words, although the alignment film ALd can be used in a liquid crystal display device, the alignment film ALc is unsuitable. This is because when the alignment film ALc is used, the anchoring intensity may be insufficient.

In the PDLC display device, since the liquid crystal molecules MC are controlled by the polymer chain of the polymer PM, the anchoring intensity of the alignment film may be smaller than that of the liquid crystal display device. The alignment film having the anchoring intensity AC1 (specifically, 0.5 mJ/$m^2$) or more exerts its function in the display device.

The lower limit value of the anchoring intensity in the PDLC display device is the anchoring intensity AC1 (specifically, 0.5 mJ/$m^2$). The alignment film ALc satisfies the condition.

On the other hand, in the alignment film ALc, the film thickness TK3 at the anchoring intensity AC1 is 25 nm. The alignment film ALc can be used for a PDLC display device as long as the film thickness is 25 nm or more.

FIGS. 7 and 8 are schematic cross-sectional views illustrating the method of manufacturing the display panel. The first substrate SUB1 having the alignment film AL1 provided on the base BA1 and the second substrate SUB2 having the alignment film AL2 provided on the base BA2 are disposed as opposed to each other and bonded by a sealant (not illustrated).

Between the first substrate SUB1 and the second substrate SUB2, more specifically, between the alignment film AL1 and the alignment film AL2, a liquid crystal material LCa containing liquid crystal molecules MC and a polymerizable monomer MM is introduced.

The liquid crystal material LCa only has to be introduced by, for example, a liquid crystal injection method or a one drop fill (ODF) method (see FIG. 7).

Subsequently, the polymerizable monomer MM in the liquid crystal material LCa is cured by applying ultraviolet light UV (see FIG. 8). As a result, the polymerizable monomer MM is polymerized to form the polymer PM containing a polymer chain. Thus, the liquid crystal layer LC of the polymer dispersed liquid crystal is formed.

The polymerizable monomer MM is polymerized by being aligned in a predetermined direction by the alignment restriction force of the alignment film AL1 and the alignment film AL2. The predetermined direction is coincident with the initial alignment direction of the alignment film AL1 and the alignment film AL2.

After the polymerizable monomer MM is polymerized, the alignment of the liquid crystal molecules MC is controlled by the polymer chain of the polymer PM, and thus the functions of the alignment films AL1 and AL2 become unnecessary.

In general, an alignment film provided in a liquid crystal display device is requested to have characteristics such as high alignment properties, abrasion resistance, and a desired volume resistance value. However, in the PDLC display device, these characteristics are unnecessary for the above-described reason.

In order to impart the characteristics described above, an alignment film of a typical liquid crystal display device contains various acid components and diamine components. These components are the causes that increase light absorption and decrease transmittance. In addition, the film thickness of the alignment film also causes a decrease in transmittance.

On the other hand, the property requested for the alignment film of the PDLC display device is only the orientation necessary for the polymerization of the polymerizable monomer MM. In such an alignment film, it is sufficient to form a film which does not contain many light absorbing components and is specialized for alignment components. Reducing the light absorbing component also leads to reducing the film thickness of the alignment film.

The method of manufacturing the alignment film of the present embodiment will be described in more detail.

To the outermost surfaces of the first substrate SUB1 and the second substrate SUB2, an alignment film material is applied. In the display device DSP illustrated in FIG. 2, the alignment film material is applied on the insulating layer INS of the first substrate SUB1 and the overcoat layer OC of the second substrate SUB2. Examples of the method of applying the alignment film material include a spin-coating method, a printing method, an ink-jet method, and the like.

After that, in order to sufficiently remove the contained organic solvent, the organic solvent is dried by heating or the like.

Subsequently, ultraviolet light or visible light is applied to the surface of the coating film of the alignment film material. The wavelength of ultraviolet light or visible light only has to be 100 nm or more and 800 nm or less. The wavelength may be preferably 100 nm or more and 400 nm or less, and more preferably 200 nm or more and 400 nm or less.

A part of the alignment film material is decomposed by the application process. The decomposed part (component) imparts an alignment restriction force to the liquid crystal layer LC to the alignment film AL1 and the alignment film AL2.

After that, if necessary, another treatment, e.g., a heat treatment is performed to form the alignment film AL1 and the alignment film AL2.

The alignment film material contains a photolytic component PD and a non-decomposition component ND. The photolytic component PD includes a transparent component TM1 and a coloring component CM1. The content of the photolytic component PD is 20 mol % or more and less than 50 mol % with respect to 1 mol of the total structural units of the alignment film material.

The photolytic component PD is decomposed when applied with ultraviolet light or visible light. The decomposed component generates an alignment restriction force on the liquid crystal molecules MC. That is, the photolytic component PD can also be said to be an alignment component.

The coloring component CM1 corresponds to the light absorbing component described above. The content of the coloring component CM1 only has to be 10 mol % or less of the entire alignment film material.

The photolytic component PD contains a polyamic acid or a polyamic acid ester having a structural unit represented by the following formula (P1).

(P1)

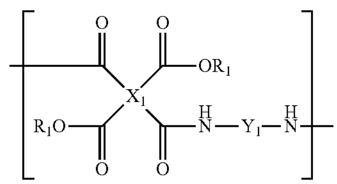

In formula (P1), X1 is a tetravalent organic group. The organic group X1 is any one of formulas (X1-1) to (X1-4). R1 is a hydrogen atom or an alkyl group having 1 to 4 carbon atoms. R3 to R23 each independently represent a hydrogen atom, a halogen atom, an alkyl group having 1 to 6 carbon atoms, an alkenyl group having 2 to 6 carbon atoms, an alkynyl group having 2 to 6 carbon atoms, a monovalent organic group having 1 to 6 carbon atoms and containing a fluorine atom, or a phenyl group, and may be the same or different.

(X1-1)

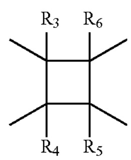

(X1-2)

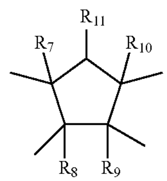

(X1-3)

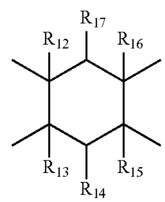

(X1-4)

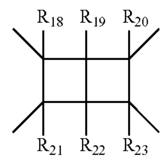

Specific examples of the structure of formula (X1-1) include structures represented by the following formulas (X1-11) to (X1-17). Specifically, formula (X1-11), formula (X1-12), and formula (X1-13) are preferable.

(X1-11)

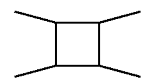

(X1-12)

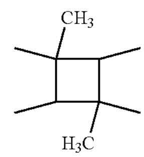

(X1-13)

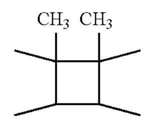

(X1-14)

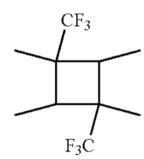

(X1-15)

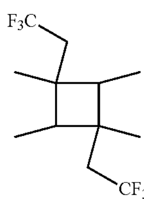

(X1-16)

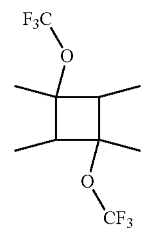

(X1-17)

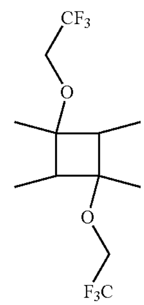

The photolytic component PD contains, as the coloring component CM1, a polyamic acid or a polyamic acid ester having a structural unit represented by formula (P1). The coloring component CM1 contains a polyamic acid or a polyamic acid ester containing an atom having an electronegativity of 3 or more, for example, nitrogen (N), oxygen (O), fluorine (F), or chlorine (Cl). When the divalent organic group Y1 has a diamine, an atom having an electronegativity of 3 or more is contained in a site other than the amine of the diamine. The content of the coloring component CM1 is set to less than 10 mol % with respect to 1 mol of the total structural units of the alignment film material.

The non-decomposition component ND includes a transparent component TM2 and a coloring component CM2. The coloring component CM2 corresponds to the light absorbing component described above. The content of the coloring component CM2 may be 10 mol % or less of the entire alignment film material.

The non-decomposition component ND contains a polyamic acid or a polyamic acid ester having a structural unit represented by the following formula (N1). The content of the non-decomposition component ND is more than 50 mol % and 80 mol % or less with respect to 1 mol of the total structural units of the alignment film material.

(N1)

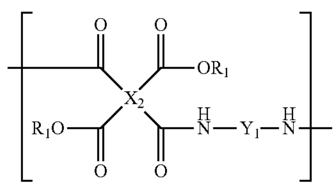

In formula (N1), X2 is a tetravalent organic group. The organic group X2 is any one of formulas (X2-1) to (X2-22).

(X2-1)

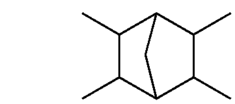

(X2-2)

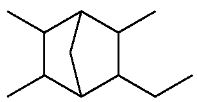

(X2-3)

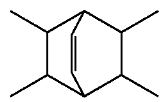

(X2-4)

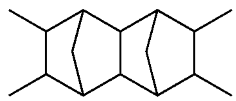

(X2-5)

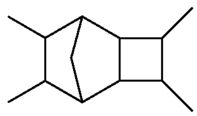

(X2-6)

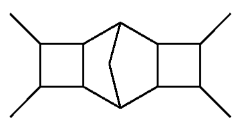

(X2-7)

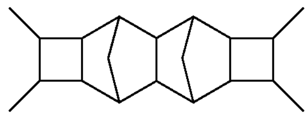

-continued (X2-8)

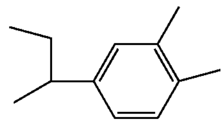

(X2-9)

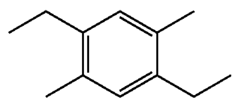

(X2-10)

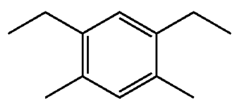

(X2-11)

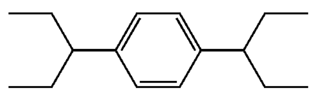

(X2-12)

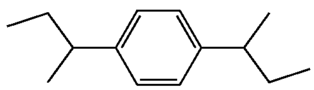

(X2-13)

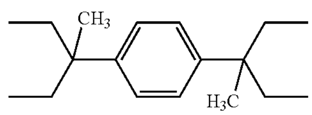

(X2-14)

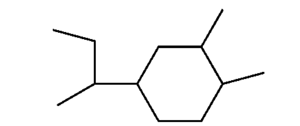

(X2-15)

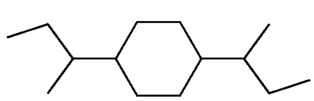

(X2-16)

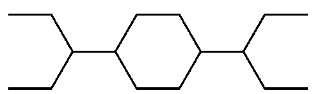

(X2-17)

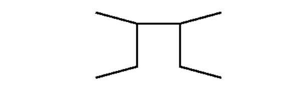

(X2-18)

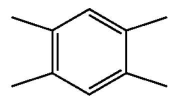

(X2-19)

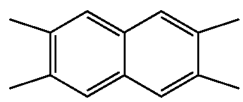

(X2-20)

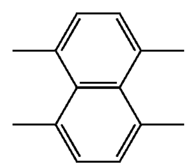

-continued (X2-21)

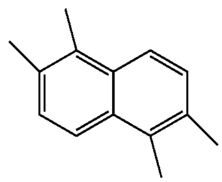

(X2-22)

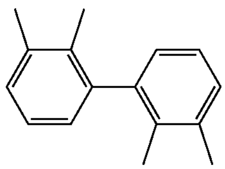

The non-decomposition component ND contains, as the coloring component CM2, a polyamic acid or a polyamic acid ester having a structural unit represented by formula (N1). The coloring component CM2 contains a polyamic acid or a polyamic acid ester containing an atom having an electronegativity of 3 or more, for example, nitrogen (N), oxygen (O), fluorine (F), or chlorine (Cl). When the divalent organic group Y1 has a diamine, an atom having an electronegativity of 3 or more is contained in a site other than the amine of the diamine. The content of the coloring component CM2 is set to less than 10 mol % with respect to 1 mol of the total structural units of the alignment film material.

The organic group Y1 in formulas (P1) and (N1) is any one of the following formulas (Y1-a1) to (Y1-a2) and (Y1-b1) to (Y1-b81).

(Y1-a1)

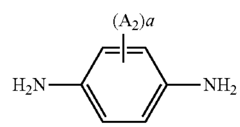

(Y1-a2)

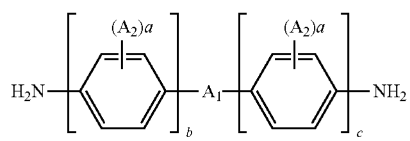

(Y1-b1)

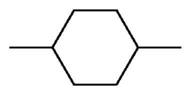

(Y1-b2)

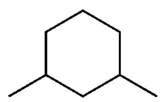

(Y1-b3)

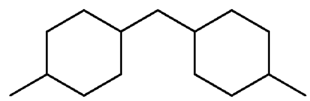

(Y1-b4)

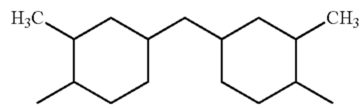

(Y1-b5)

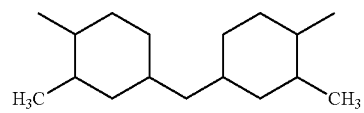

(Y1-b6)

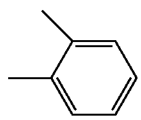

(Y1-b7)

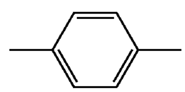

(Y1-b8)

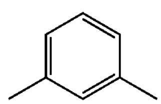

(Y1-b9)

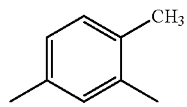

(Y1-b10)

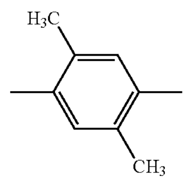

(Y1-b11)

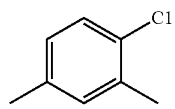

(Y1-b12)

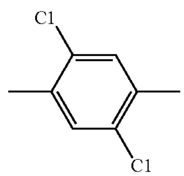

(Y1-b13)

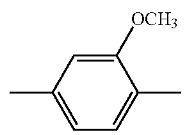

(Y1-b14)

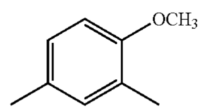

-continued
(Y1-b15)
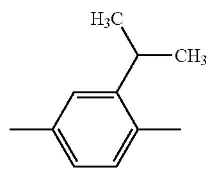
(Y1-b16)
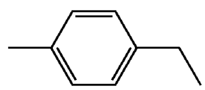
(Y1-b17)
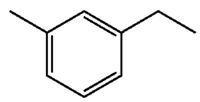
(Y1-b18)
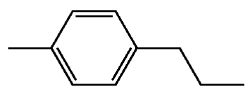
(Y1-b19)
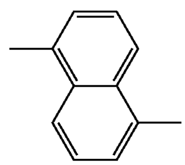
(Y1-b20)
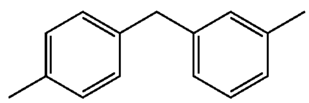
(Y1-b21)
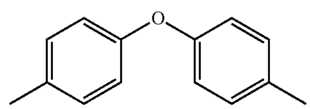
(Y1-b22)
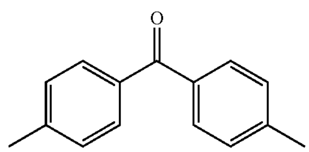
(Y1-b23)
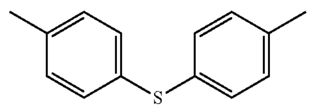
(Y1-b24)
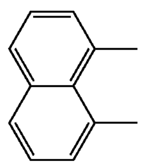
(Y1-b25)
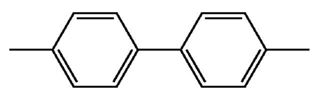
(Y1-b26)
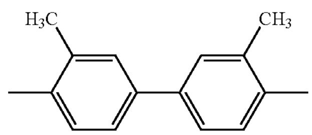
(Y1-b27)
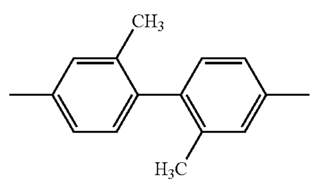
(Y1-b28)
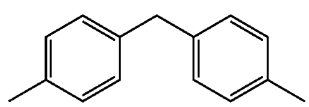
(Y1-b29)
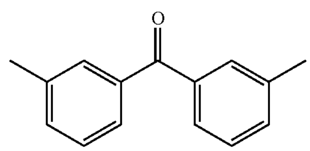
(Y1-b30)
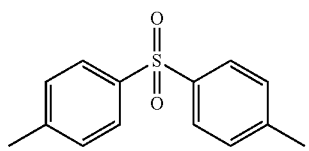
(Y1-b31)
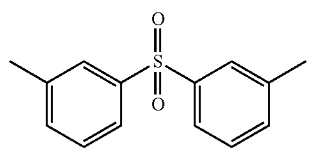
(Y1-b32)
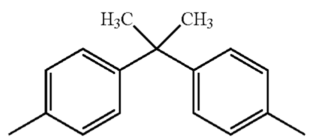
(Y1-b33)
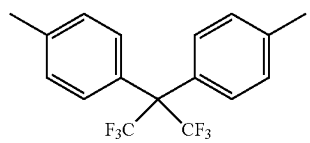
(Y1-b34)
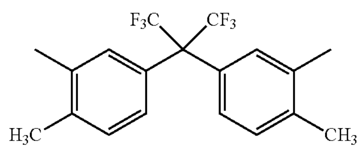

-continued
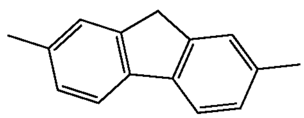
(Y1-b35)
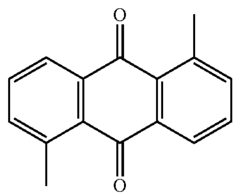
(Y1-b36)
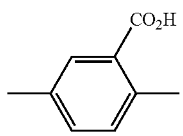
(Y1-b37)
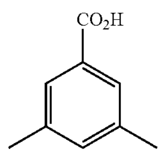
(Y1-b38)
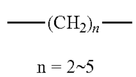
n = 2~5
(Y1-b39)
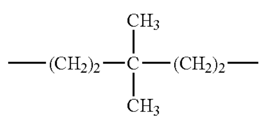
(Y1-b40)
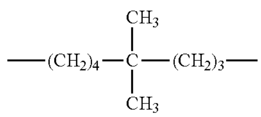
(Y1-b41)
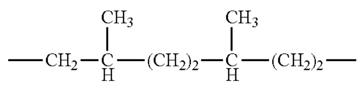
(Y1-b42)
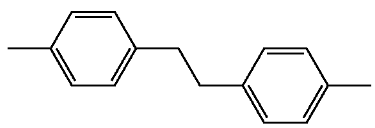
(Y1-b43)
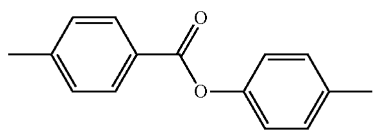
(Y1-b44)
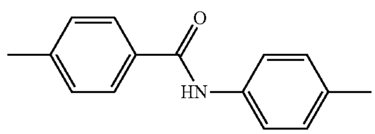
(Y1-b45)
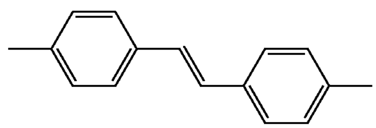
(Y1-b46)
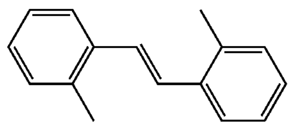
(Y1-b47)
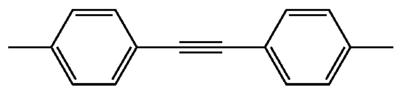
(Y1-b48)
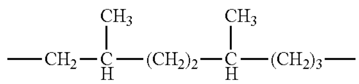
(Y1-b49)
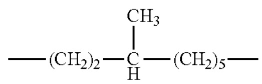
(Y1-b50)
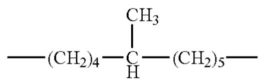
(Y1-b51)
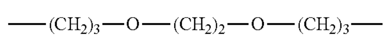
(Y1-b52)
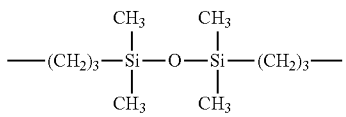
(Y1-b53)
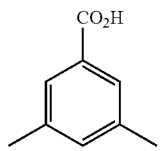
(Y1-b54)
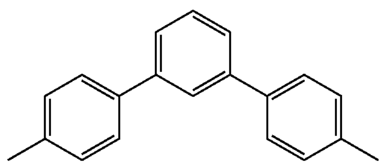
(Y1-b55)
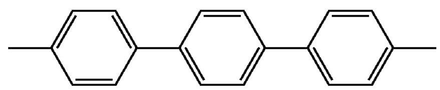
(Y1-b56)

-continued
(Y1-b57)
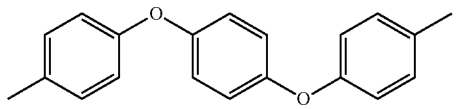
(Y1-b58)
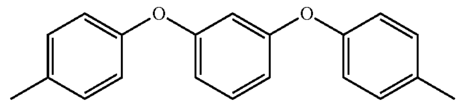
(Y1-b59)
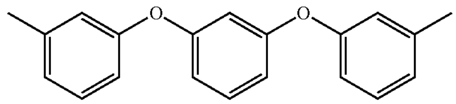
(Y1-b60)
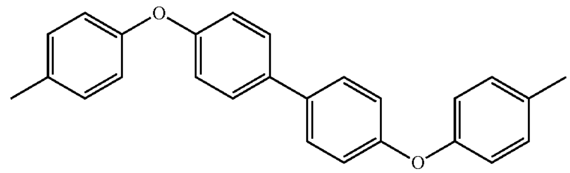
(Y1-b61)
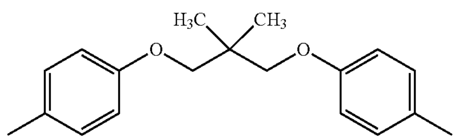
(Y1-b62)
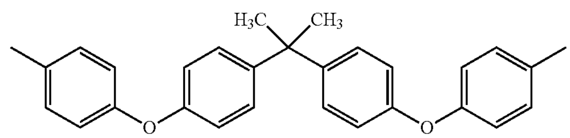
(Y1-b63)
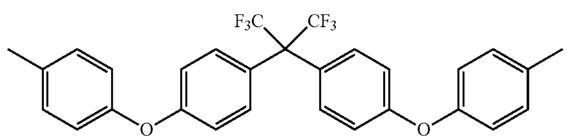
(Y1-b64)
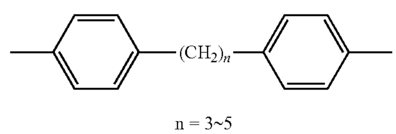
n = 3~5
(Y1-b65)
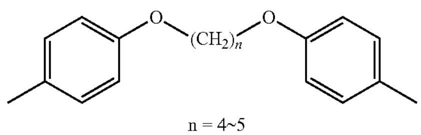
n = 4~5
(Y1-b66)
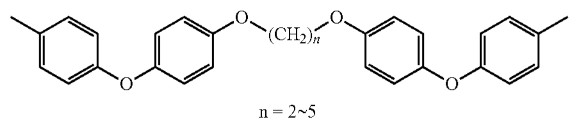
n = 2~5
(Y1-b67)
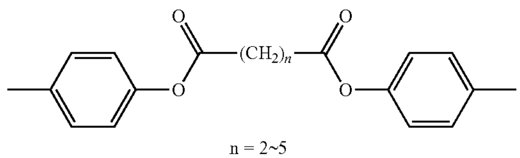
n = 2~5
(Y1-b68)
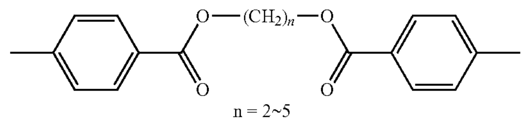
n = 2~5
(Y1-b69)
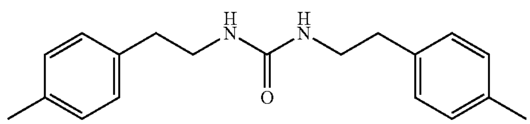
(Y1-b70)
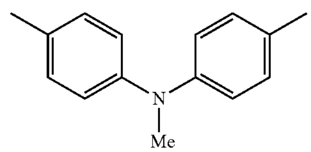
(Y1-b71)
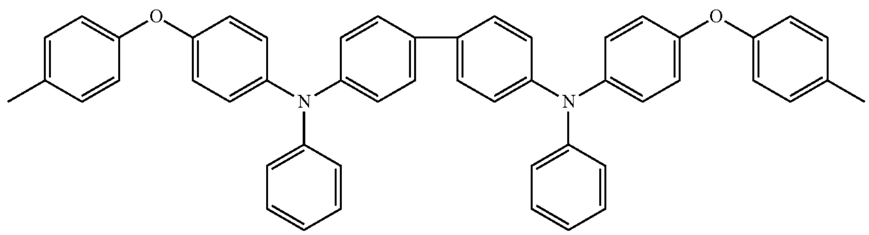

-continued (Y1-b72)

(Y1-b73)

(Y1-b74)

(Y1-b75)

(Y1-b76)

(Y1-b77)

(Y1-b78)

(Y1-b79)

(Y1-b80)

(Y1-b81)

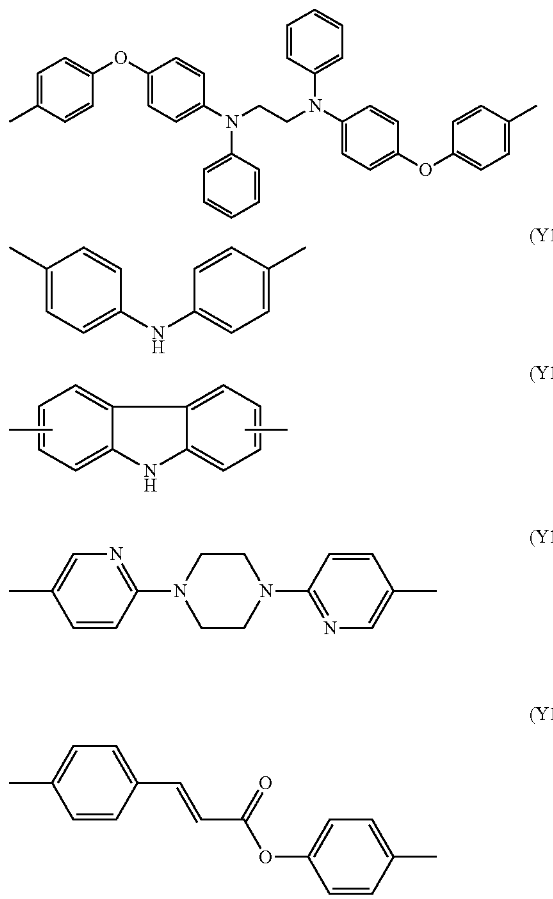

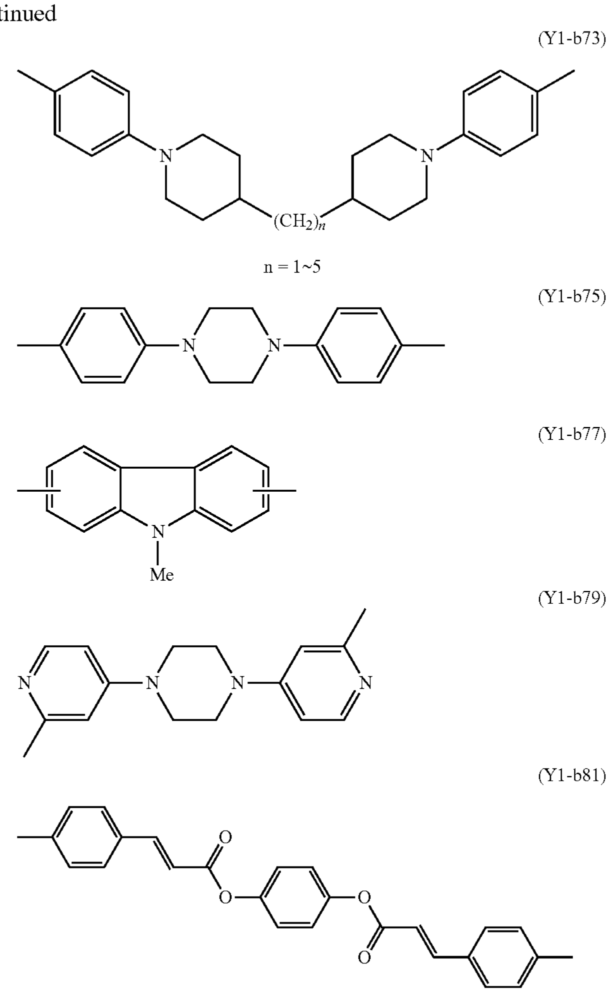

A1 of formula (Y1-a2) is a single bond, an ester bond, an amide bond, a thioester bond, or a divalent organic group having 2 to 20 carbon atoms, A2 of each of formula (Y1-a1) and formula (Y1-a2) is a hydrogen atom, a halogen atom, a hydroxyl group, an amino group, a thiol group, a nitro group, a phosphoric acid group, or a monovalent organic group having 1 to 20 carbon atoms, a of each of formula (Y1-a1) and formula (Y1-a2) is an integer from 1 to 4, and when a is 2 or more, the structures of A1 may be the same or different. b and c in formula (Y1-a2) are each independently an integer from 1 to 2.

As described above, the coloring components CM1 and CM2 contain atoms having an electronegativity of 3 or more. Examples of formula (Y1-a1) and formula (Y1-a2) include those containing an atom having an electronegativity of 3 or more. Among formulas (Y1-b1) to (Y1-b81), the atoms having an electronegativity of 3 or more are contained in formulas (Y1-b11) to (Y1-b14), formulas (Y1-b21) to (Y1-b22), formulas (Y1-b29) to (Y1-b31), formulas (Y1-b33) to (Y1-b34), formulas (Y1-b36) to (Y1-b38), formulas (Y1-b44) to (Y1-b45), formulas (Y1-b52) to (Y1-b54), formulas (Y1-b57) to (Y1-b63), and formulas (Y1-b65) to (Y1-b81). As the coloring component CM1, formula (P1) containing the above formula may be used as the organic group Y1. As the coloring component CM2, formula (N1) containing the above formula may be used as the organic group Y1.

In contrast, the organic group Y1 contained in the transparent components TM1 and TM2 may not contain an atom having an electronegativity of 3 or more among formulas (Y1-a1) to (Y1-a2) and formulas (Y1-b1) to (Y1-b81). Specifically, the organic group Y1 only has to be any of those not containing an atom having an electronegativity of 3 or more in formulas (Y1-a1) and (Y1-a2), formulas (Y1-b1) to (Y1-b10), formulas (Y1-b15) to (Y1-b20), formulas (Y1-b23) to (Y1-b28), formula (Y1-b32), formula (Y1-b35), formulas (Y1-b39) to (Y1-b43), formulas (Y1-b46) to (Y1-b51), formulas (Y1-b55) to (Y1-b56), and formulas (Y1-b64). As the transparent component TM1, formula (P1) containing the above formula may be used as the organic group Y1. As the transparent component TM2, formula (N1) containing the above formula may be used as the organic group Y1.

The film thicknesses of the alignment film AL1 and the alignment film AL2 formed using the above materials may be 20 nm or more and 200 nm or less, preferably 40 nm or more and 120 nm or less, and more preferably 20 nm or more and 60 nm or less.

In the alignment film AL1 and the alignment film AL2 of the present embodiment, the contents of the coloring component CM1 and the coloring component CM2 are as small as less than 10 mol % with respect to 1 mol of the total structural unit of the alignment film material. However, the display device DSP (display panel PNL), which is a PDLC display device, has a sufficient alignment restriction force even with the above film thickness as described with reference to FIG. 6.

In the present embodiment, it is possible to reduce the introduction amounts of the coloring component CM1 and the coloring component CM2 in the alignment film material. By reducing the introduction amount of the coloring component, which is the light absorbing component, it is possible to suppress the absorption of light guided to the display panel PNL. In addition, according to the present embodiment, it is possible to reduce the film thicknesses of the alignment films AL1 and AL2. From the above, it is possible to improve the transmittance of the transparent display. It is possible to an increase in the luminance and to reduce color shift of the display device DSP. According to the present embodiment, the display of the display device DSP becomes more uniform.

In the present disclosure, the transparent components TM1 and TM2 and the coloring components CM1 and CM2 are referred to as a first transparent component and a second transparent component, and a first coloring component and a second coloring component, respectively. The same applies to not only the first embodiment but also the following second embodiment.

Second Embodiment

In a second embodiment, the molar ratio of a photolytic component PD to a non-decomposition component ND is different from that in the first embodiment.

In the present embodiment, the content of the photolytic component PD is 50 mol % or more and 100 mol % or less. The content of the non-decomposition component ND is 0 mol % or more and 50 mol % or less. The photolytic component PD has a transparent component TM1 and a coloring component CM1 as in the first embodiment. The non-decomposition component ND also has a transparent component TM2 and a coloring component CM2 as in the first embodiment. Since each component is the same as that in the first embodiment, the description of the first embodiment is incorporated, and details are omitted.

Also in the present embodiment, the contents of the coloring component CM1 and the coloring component CM2 are less than 10 mol % with respect to 1 mol of the total structural unit of the alignment film material. By reducing the contents of the coloring component CM1 and the coloring component CM2, which are light absorbing components, it is possible to reduce the absorption of the light GLr by the alignment film AL1 and the alignment film AL2.

In the alignment film AL1 and the alignment film AL2 of the present embodiment, since the ratio of the photolytic component PD as an alignment component is larger than that in the first embodiment, it is possible to obtain a higher alignment restriction force. Even though the film thicknesses of the alignment film AL1 and the alignment film AL2 are thin, it is possible to sufficiently improve the transmittance of the display device DSP, and it is possible to increase in luminance and to reduce the color shift. According to the present embodiment, the display of the display device DSP becomes more uniform.

In the present embodiment, the film thicknesses of the alignment film AL1 and the alignment film AL2 are preferably 10 nm or more and 60 nm or less. Further, the film thickness is more preferably 20 nm or more and 50 nm or less. Such an alignment film having the film thicknesses is too thin to be used in a liquid crystal display device having a liquid crystal layer different from PDLC. However, in the PDLC display device, as described above, the alignment restriction force of the alignment film is requested only at the time of polymerization of the polymerizable monomer MM. For this reason, the above-described thin film thickness is sufficient for the alignment film of the present embodiment.

Also in the present embodiment, effects similar to those of the first embodiment are obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a display device, the method comprising:

applying an alignment film material containing a photolytic component and a non-photolytic component to a surface of a first substrate and a surface of a second substrate;

applying ultraviolet light or visible light to the alignment film material to decompose the photolytic component, thus forming a first alignment film on the first substrate and a second alignment film on the second substrate;

introducing a liquid crystal material containing liquid crystal molecules and a polymerizable monomer between the first alignment film and the second alignment film; and applying ultraviolet light to the liquid crystal material to polymerize the polymerizable monomer in the liquid crystal material to form a polymer containing a polymer chain, thus forming a polymer dispersed liquid crystal layer, wherein the photolytic component contains a first transparent component and a first coloring component, the non-photolytic component includes a second transparent component and a second coloring component, the first transparent component contains a polyamic acid or a polyamic acid ester having a structural unit represented by formula (P1), (P1)

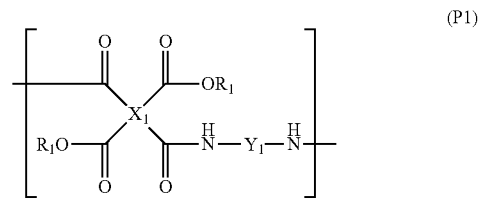

the X1 is any of formulas (X1-1) to (X1-4), (X1-1)

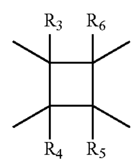

-continued (X1-2)

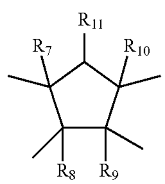

(X1-3)

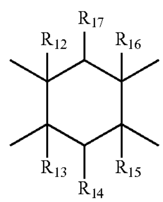

(X1-4)

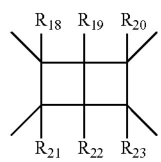

the R1 in the formula (P1) is a hydrogen atom or an alkyl group having 1 to 4 carbon atoms, and the R3 to R23 in the formulas (X1-1) to (X1-4) are each independently a hydrogen atom, a halogen atom, an alkyl group having 1 to 6 carbon atoms, an alkenyl group having 2 to 6 carbon atoms, an alkynyl group having 2 to 6 carbon atoms, a monovalent organic group having 1 to 6 carbon atoms and containing a fluorine atom, or a phenyl group, a content of the photolytic component is 20 mol % or more and less than 50 mol % with respect to 1 mol of all structural units of the alignment film material, the first coloring component contains a polyamic acid or a polyamic acid ester having a structural unit represented by the formula (P1), the Y1 of the formula (P1) of the first coloring component contains a polyamic acid or a polyamic acid ester containing nitrogen, oxygen, fluorine, and chlorine, a content of the first coloring component is less than 10 mol % with respect to 1 mol of all structural units of the alignment film material, the non-decomposition component ND contains a polyamic acid or a polyamic acid ester having a structural unit represented by formula (N1), (N1)

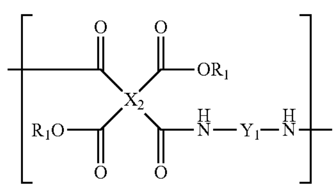

the X2 in formula (N1) is any of formulas (X2-1) to (X2-22), (X2-1)

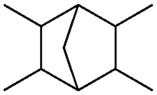

(X2-2)

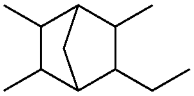

(X2-3)

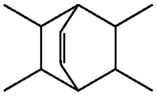

(X2-4)

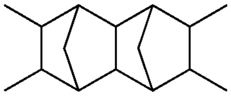

(X2-5)

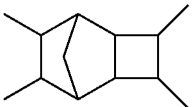

(X2-6)

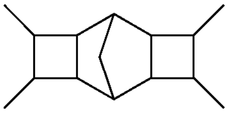

(X2-7)

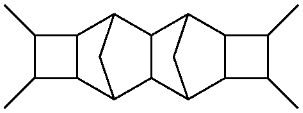

(X2-8)

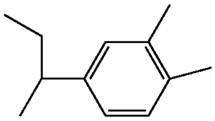

(X2-9)

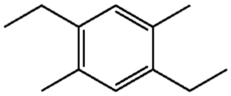

(X2-10)

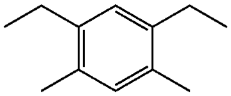

(X2-11)

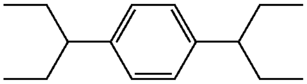

(X2-12)

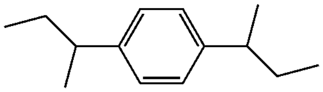

(X2-13)

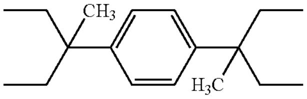

(X2-14)

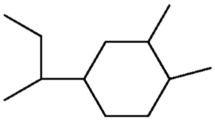

-continued (X2-15)

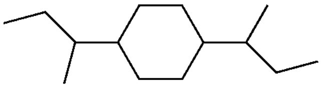

(X2-16)

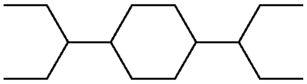

(X2-17)

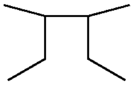

(X2-18)

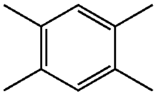

(X2-19)

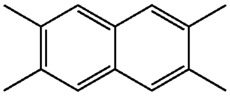

(X2-20)

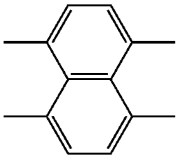

(X2-21)

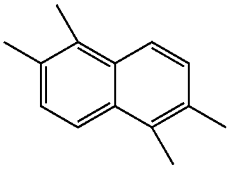

(X2-22)

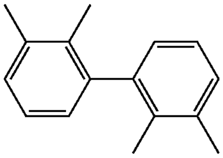

a content of the non-decomposition component is more than 50 mol % and less than 80 mol % with respect to 1 mol of all structural units of the alignment film material, the second coloring component contains a polyamic acid or a polyamic acid ester having the structural unit represented by formula (N1), the Y1 of the formula (N1) of the second coloring component contains nitrogen (N), oxygen (O), fluorine (F), and chlorine (Cl), a content of the second coloring component is 10 mol % or less of the entire alignment film material, the Y1 of the formula (P1) and the Y1 of the formula (N1) are any of formulas (Y1-a1) to (Y1-a2) and formulas (Y1-b1) to (Y1-b81), respectively, and (Y1-a1)

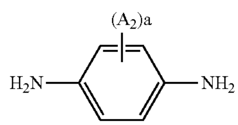

-continued (Y1-a2)

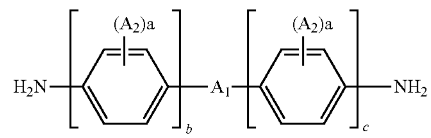

(Y1-b1)

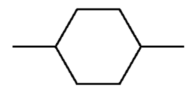

(Y1-b2)

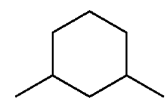

(Y1-b3)

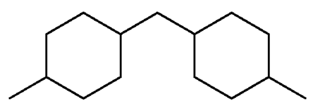

(Y1-b4)

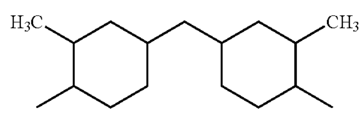

(Y1-b5)

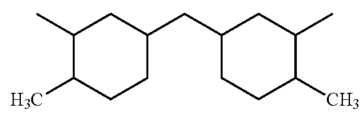

(Y1-b6)

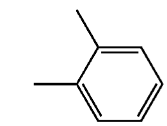

(Y1-b7)

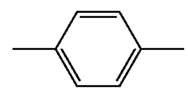

(Y1-b8)

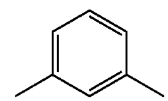

(Y1-b9)

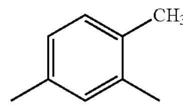

(Y1-b10)

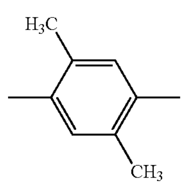

(Y1-b11)

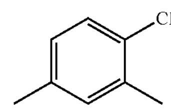

-continued
(Y1-b12)
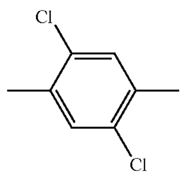
(Y1-b13)
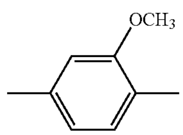
(Y1-b14)
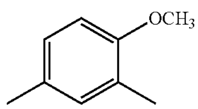
(Y1-b15)
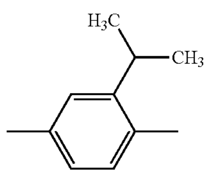
(Y1-b16)
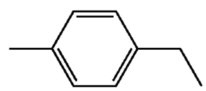
(Y1-b17)
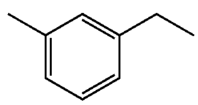
(Y1-b18)
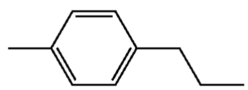
(Y1-b19)
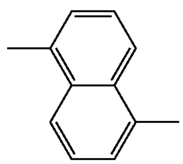
(Y1-b20)
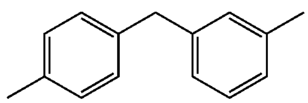
(Y1-b21)
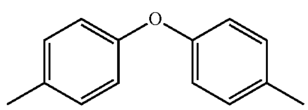
(Y1-b22)
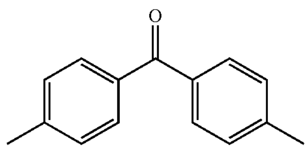
(Y1-b23)
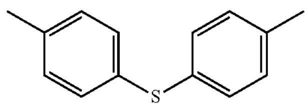
-continued
(Y1-b24)
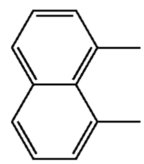
(Y1-b25)
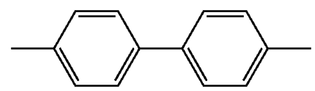
(Y1-b26)
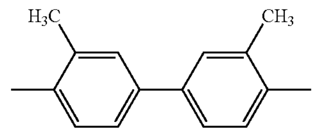
(Y1-b27)
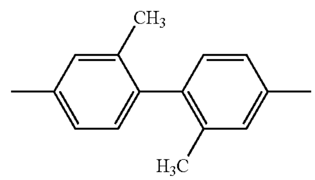
(Y1-b28)
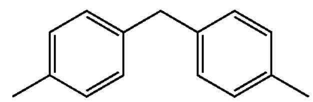
(Y1-b29)
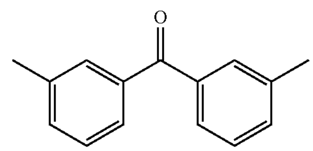
(Y1-b30)
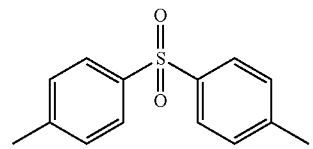
(Y1-b31)
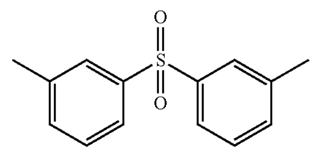
(Y1-b32)
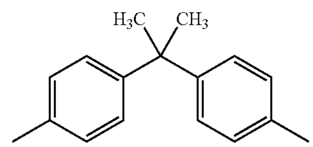
(Y1-b33)
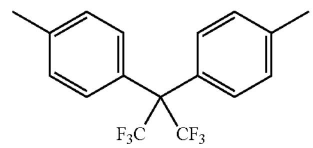

-continued
(Y1-b34)
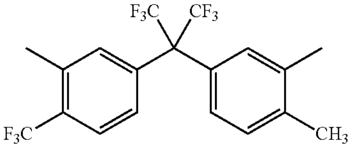
(Y1-b35)
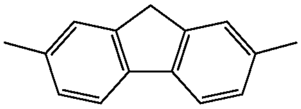
(Y1-b36)
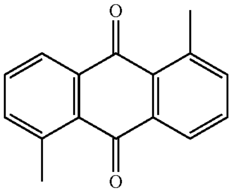
(Y1-b37)
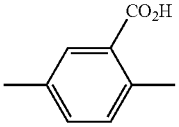
(Y1-b38)
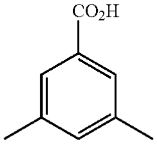
(Y1-b39)
$$-(CH_2)_n-$$
n = 2 ~ 5
(Y1-b40)
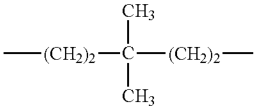
(Y1-b41)
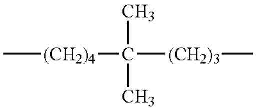
(Y1-b42)
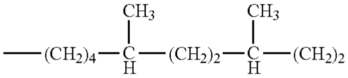
(Y1-b43)
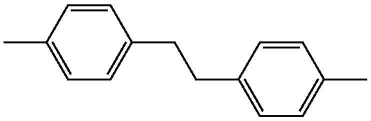
(Y1-b44)
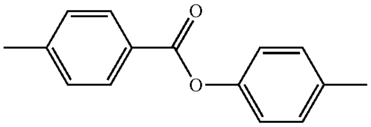
(Y1-b45)
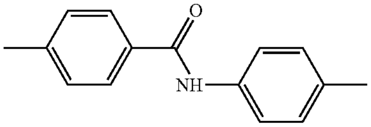
-continued
(Y1-b46)
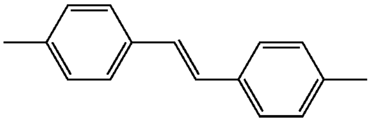
(Y1-b47)
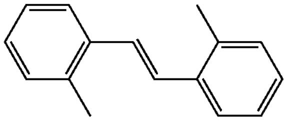
(Y1-b48)
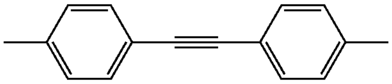
(Y1-b49)
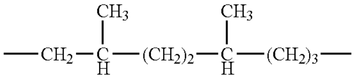
(Y1-b50)
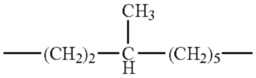
(Y1-b51)
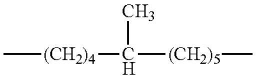
(Y1-b52)
$$-(CH_2)_3-O-(CH_2)_2-O-(CH_2)_3-$$
(Y1-b53)
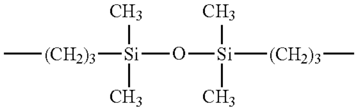
(Y1-b54)
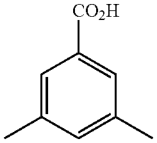
(Y1-b55)
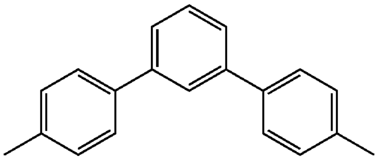
(Y1-b56)
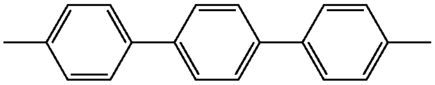
(Y1-b57)
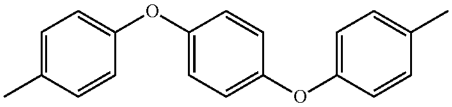
(Y1-b58)
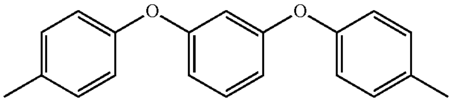
(Y1-b59)
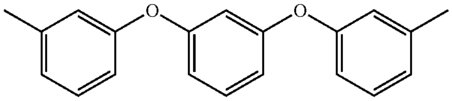

-continued
(Y1-b60)
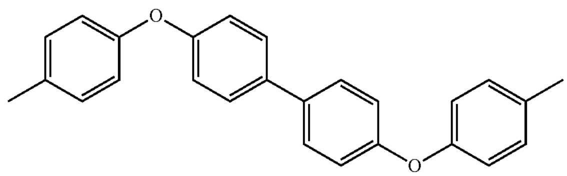
(Y1-b61)
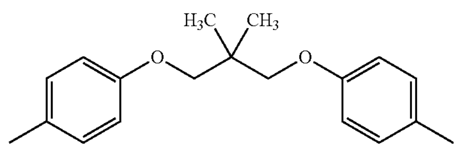
(Y1-b62)
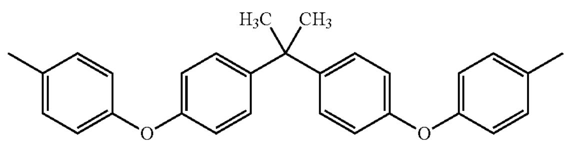
(Y1-b63)
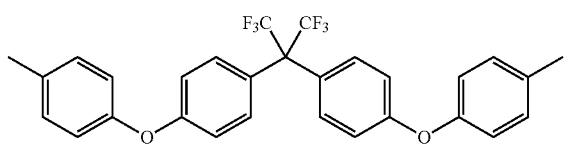
(Y1-b64)
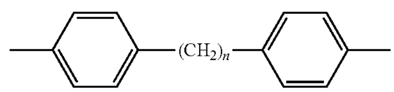
n = 3 ~ 5
(Y1-b65)
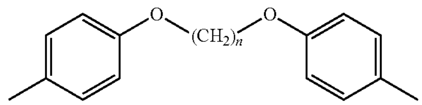
n = 4 ~ 5
(Y1-b66)
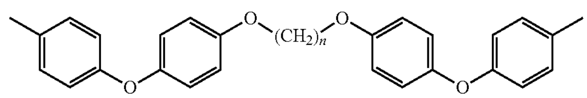
n = 2 ~ 5
(Y1-b67)
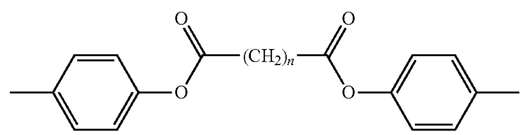
n = 2 ~ 5
(Y1-b68)
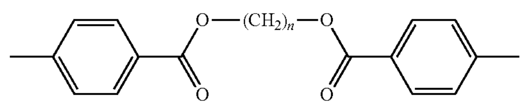
n = 2 ~ 5
-continued
(Y1-b69)
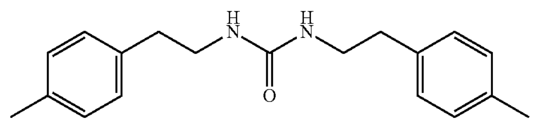
(Y1-b70)
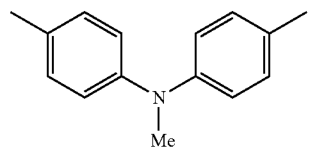
(Y1-b71)
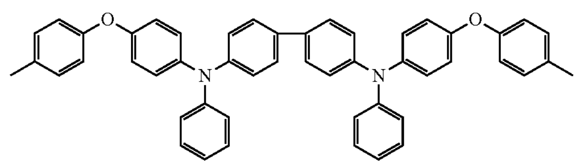
(Y1-b72)
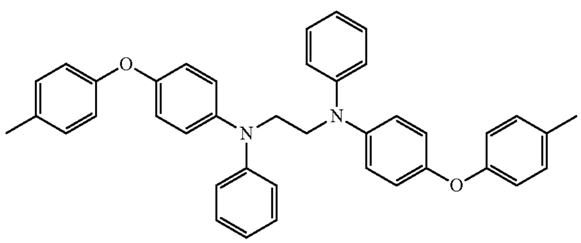
(Y1-b73)
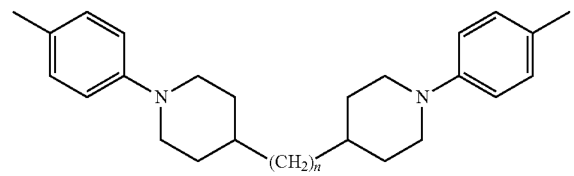
n = 1 ~ 5
(Y1-b75)
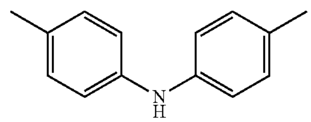
(Y1-b76)
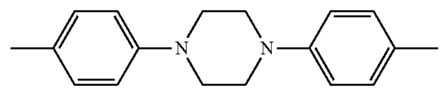
(Y1-b77)
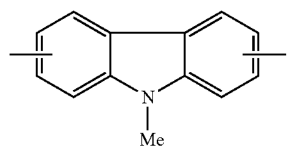
(Y1-b78)
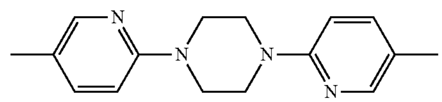

-continued (Y1-b79)

(Y1-b80)

(Y1-b81)

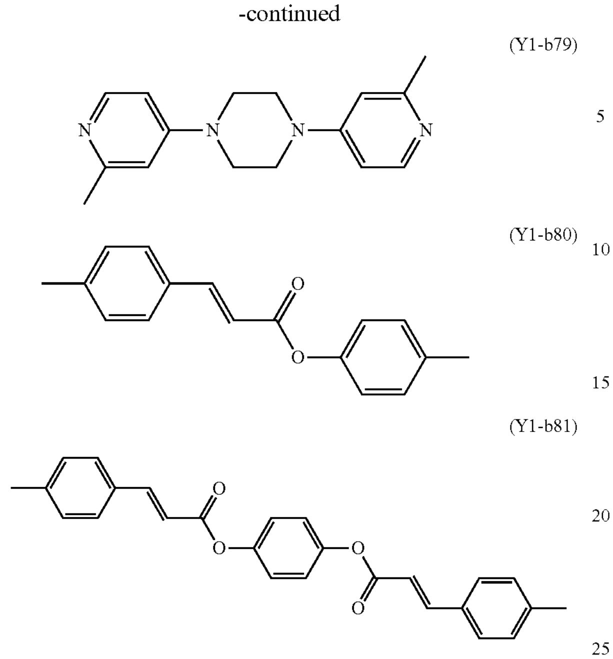

the A1 of the formula (Y1-a2) is a single bond, an ester bond, an amide bond, a thioester bond, or a divalent organic group having 2 to 20 carbon atoms, the A2 of the formula (Y1-a1) and the formula (Y1-a2) is a hydrogen atom, a halogen atom, a hydroxyl group, an amino group, a thiol group, a nitro group, a phosphoric acid group, or a monovalent organic group having 1 to 20 carbon atoms, the a of the formula (Y1-a1) and the formula (Y1-a2) is an integer of 1 to 4, and the b and the c of the formula (Y1-a2) are independently an integer of 1 to 2.

2. The method of manufacturing a display device according to claim 1, wherein the X1 is any of formulas (X1-11) to (X1-17).

(X1-11)

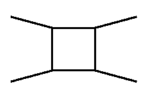

(X1-12)

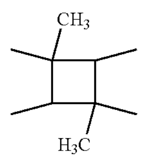

(X1-13)

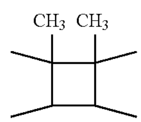

(X1-14)

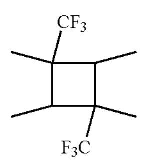

-continued (X1-15)

(X1-16)

(X1-17)

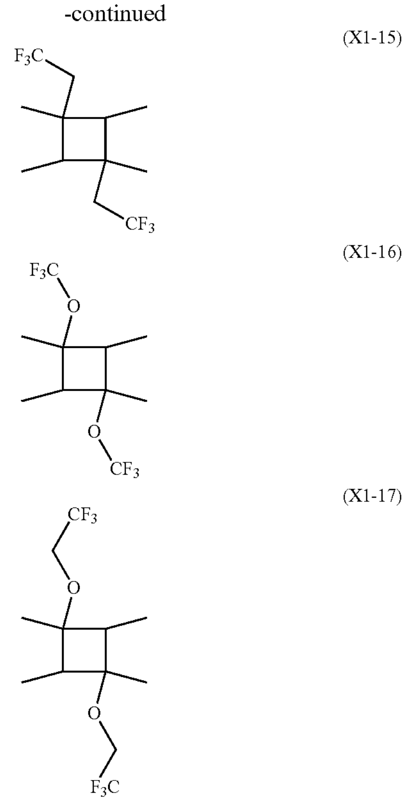

3. The method of manufacturing a display device according to claim 1, wherein the formula (Y1-a1) and the formula (Y1-a2) contain an atom having an electronegativity of 3 or more at a site other than amine of diamine.

4. The method of manufacturing a display device according to claim 1, wherein the Y1 is any one of the formulas (Y1-b11) to (Y1-b14), the formulas (Y1-b21) to (Y1-b22), the formulas (Y1-b29) to (Y1-b31), the formulas (Y1-b33) to (Y1-b34), the formulas (Y1-b36) to (Y1-b38), the formulas (Y1-b44) to (Y1-b45), the formulas (Y1-b52) to (Y1-b54), the formulas (Y1-b57) to (Y1-b63), and the formulas (Y1-b65) to (Y1-b81).

5. The method of manufacturing a display device according to claim 1, wherein a film thickness of the first alignment film and a film thickness of the second alignment film are 20 nm or more and 200 nm or less, respectively.

6. The method of manufacturing a display device according to claim 1, wherein a film thickness of the first alignment film and a film thickness of the second alignment film are 40 nm or more and 120 nm or less, respectively.

7. The method of manufacturing a display device according to claim 1, wherein a film thickness of the first alignment film and a film thickness of the second alignment film are 20 nm or more and 60 nm or less, respectively.

8. A method of manufacturing a display device, comprising:

applying an alignment film material containing a photolytic component and a non-photolytic component to a surface of a first substrate and a surface of a second substrate;

applying ultraviolet light or visible light to the alignment film material to decompose the photolytic component, thus forming a first alignment film on the first substrate and a second alignment film on the second substrate;

introducing a liquid crystal material containing liquid crystal molecules and a polymerizable monomer between the first alignment film and the second alignment film; and applying ultraviolet light to the liquid crystal material to polymerize the polymerizable monomer in the liquid crystal material to form a polymer containing a polymer chain, thus forming a polymer dispersed liquid crystal layer, wherein the photolytic component contains a first transparent component and a first coloring component, the non-photolytic component includes a second transparent component and a second coloring component, the first transparent component contains a polyamic acid or a polyamic acid ester having a structural unit represented by formula (P1), (P1)

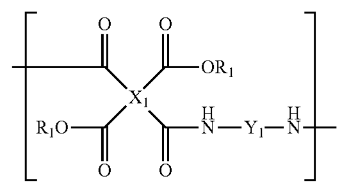

the X1 is any of formulas (X1-1) to (X1-4), (X1-1)

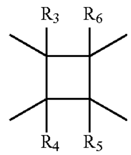

(X1-2)

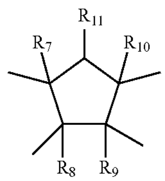

(X1-3)

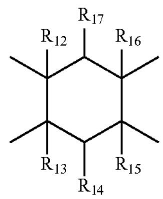

(X1-4)

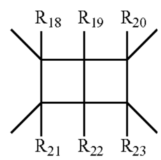

the R1 in the formula (P1) is a hydrogen atom or an alkyl group having 1 to 4 carbon atoms, and the R3 to R23 in the formulas (X1-1) to (X1-4) are each independently a hydrogen atom, a halogen atom, an alkyl group having 1 to 6 carbon atoms, an alkenyl group having 2 to 6 carbon atoms, an alkynyl group having 2 to 6 carbon atoms, a monovalent organic group having 1 to 6 carbon atoms and containing a fluorine atom, or a phenyl group, a content of the photolytic component is 50 mol % or more and 100 mol % or less with respect to 1 mol of all structural units of the alignment film material, the first coloring component contains a polyamic acid or a polyamic acid ester having a structural unit represented by the formula (P1), the Y1 of the formula (P1) of the first coloring component contains a polyamic acid or a polyamic acid ester containing nitrogen, oxygen, fluorine, and chlorine, a content of the first coloring component is less than 10 mol % with respect to 1 mol of all structural units of the alignment film material, the non-decomposition component ND contains a polyamic acid or a polyamic acid ester having a structural unit represented by formula (N1), (N1)

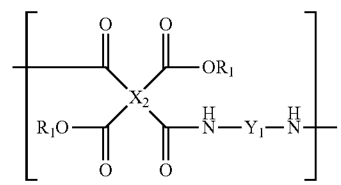

the X2 in the formula (N1) is any of formulas (X2-1) to (X2-22), (X2-1)

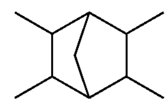

(X2-2)

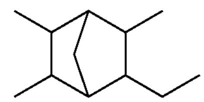

(X2-3)

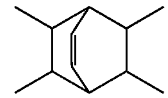

(X2-4)

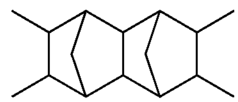

(X2-5)

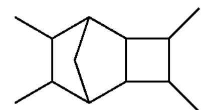

(X2-6)

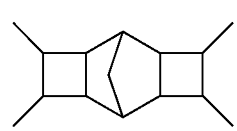

(X2-7)

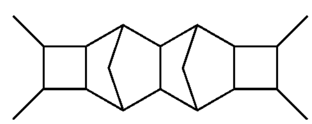

-continued (X2-8)

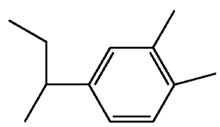

(X2-9)

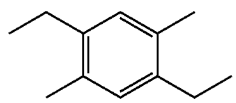

(X2-10)

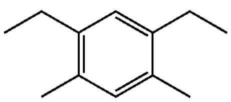

(X2-11)

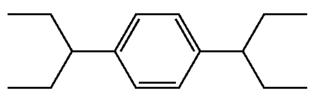

(X2-12)

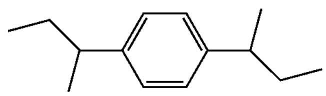

(X2-13)

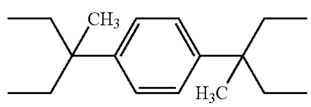

(X2-14)

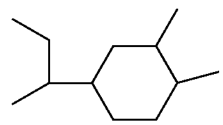

(X2-15)

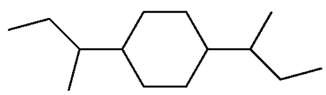

(X2-16)

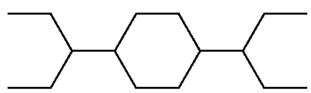

(X2-17)

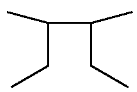

(X2-18)

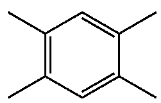

(X2-19)

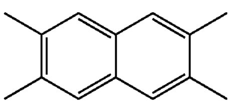

(X2-20)

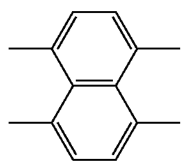

-continued (X2-21)

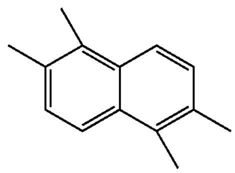

(X2-22)

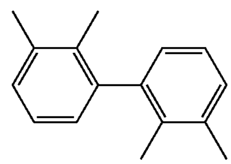

a content of the non-decomposition component is 0 mol % or more and 50 mol % or less with respect to 1 mol of all structural units of the alignment film material, the second coloring component contains a polyamic acid or a polyamic acid ester having the structural unit represented by the formula (N1), the Y1 of the formula (N1) of the second coloring component contains nitrogen (N), oxygen (O), fluorine (F), and chlorine (Cl), a content of the second coloring component is 10 mol % or less of the entire alignment film material, the Y1 of the formula (P1) and the Y1 of the formula (N1) are any of formulas (Y1-a1) to (Y1-a2) and formulas (Y1-b1) to (Y1-b81), respectively, and (Y1-a1)

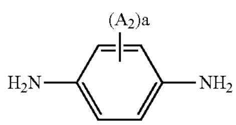

(Y1-a2)

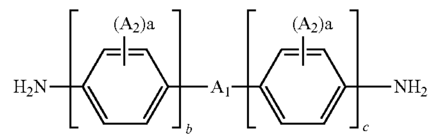

(Y1-b1)

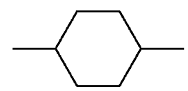

(Y1-b2)

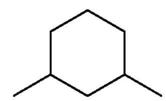

(Y1-b3)

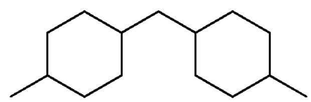

(Y1-b4)

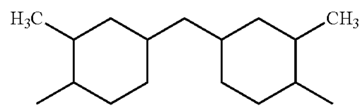

(Y1-b5)

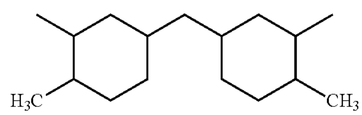

-continued
(Y1-b6)
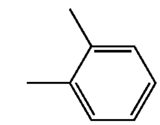
(Y1-b7)
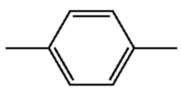
(Y1-b8)
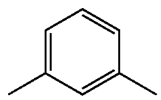
(Y1-b9)
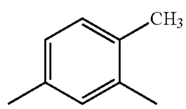
(Y1-b10)
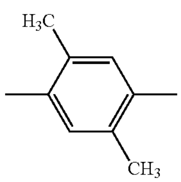
(Y1-b11)
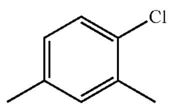
(Y1-b12)
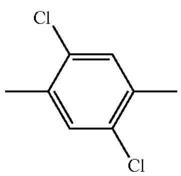
(Y1-b13)
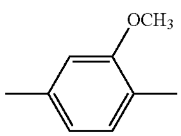
(Y1-b14)
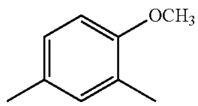
(Y1-b15)
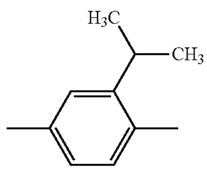
(Y1-b16)
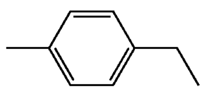
(Y1-b17)
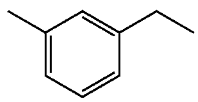
-continued
(Y1-b18)
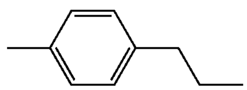
(Y1-b19)
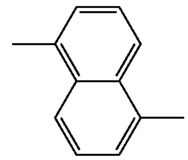
(Y1-b20)
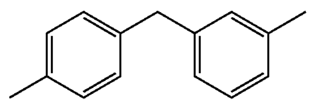
(Y1-b21)
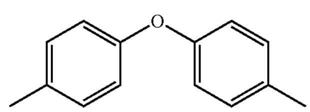
(Y1-b22)
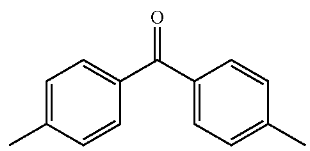
(Y1-b23)
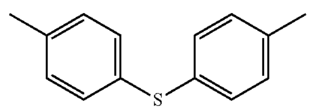
(Y1-b24)
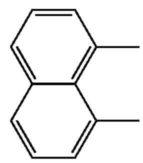
(Y1-b25)
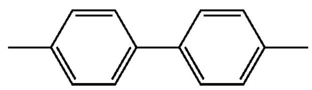
(Y1-b26)
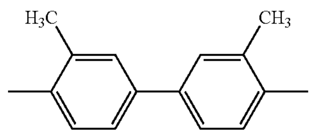
(Y1-b27)
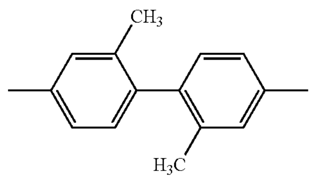
(Y1-b28)
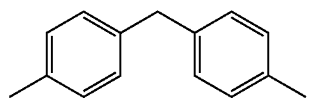
(Y1-b29)
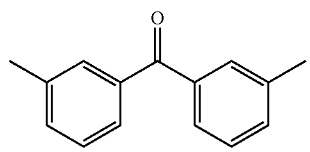

-continued
(Y1-b30)
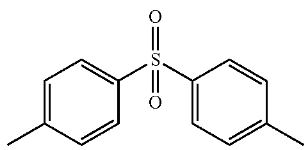
(Y1-b31)
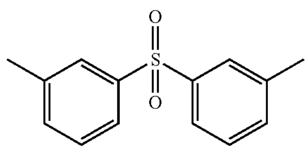
(Y1-b32)
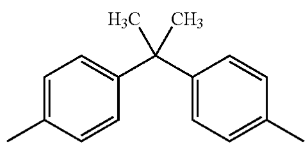
(Y1-b33)
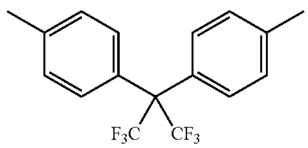
(Y1-b34)
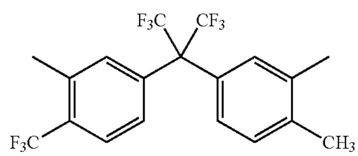
(Y1-b35)
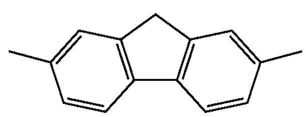
(Y1-b36)
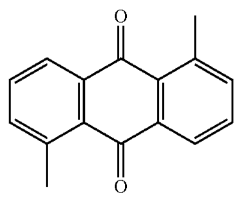
(Y1-b37)
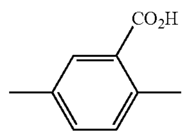
(Y1-b38)
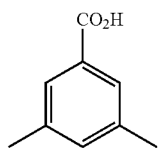
(Y1-b39)
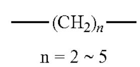
n = 2 ~ 5
(Y1-b40)
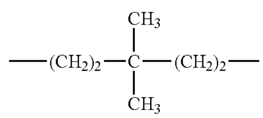
-continued
(Y1-b41)
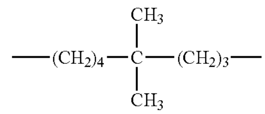
(Y1-b42)
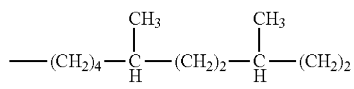
(Y1-b43)
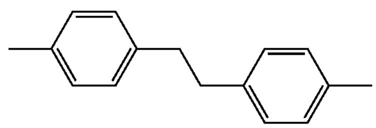
(Y1-b44)
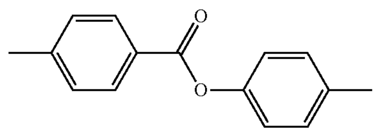
(Y1-b45)
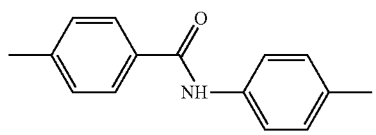
(Y1-b46)
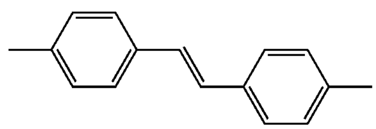
(Y1-b47)
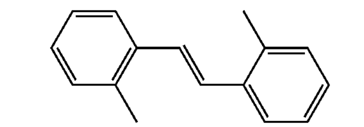
(Y1-b48)
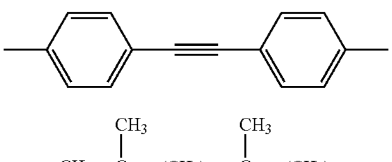
(Y1-b49)
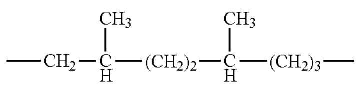
(Y1-b50)
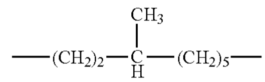
(Y1-b51)
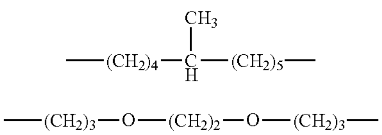
(Y1-b52)
(Y1-b53)
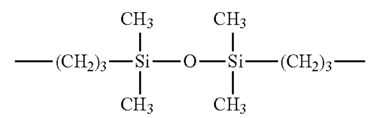
(Y1-b54)
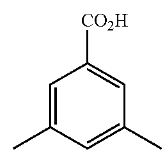

-continued
(Y1-b55)
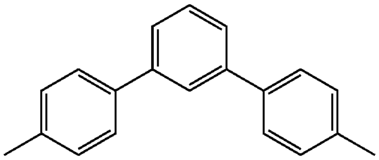
(Y1-b56)
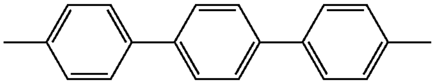
(Y1-b57)
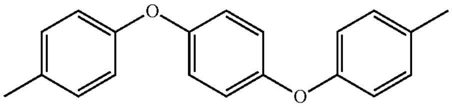
(Y1-b58)
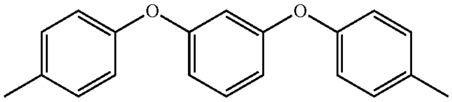
(Y1-b59)
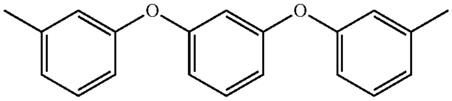
(Y1-b60)
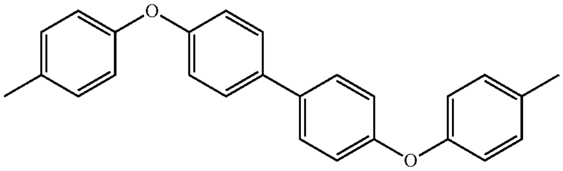
(Y1-b61)
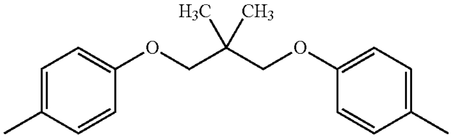
(Y1-b62)
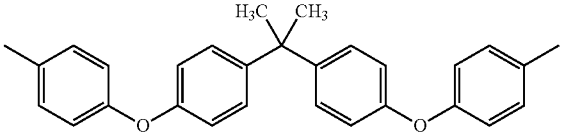
(Y1-b63)
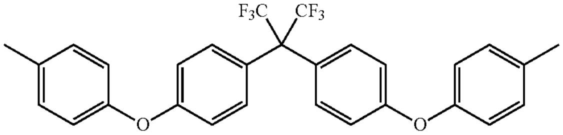
(Y1-b64)
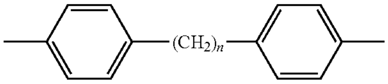
n = 3 ~ 5
(Y1-b65)
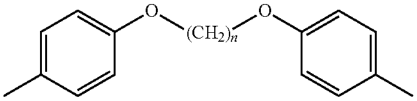
n = 4 ~ 5
-continued
(Y1-b66)
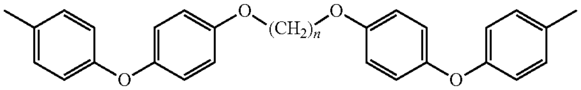
n = 2 ~ 5
(Y1-b67)
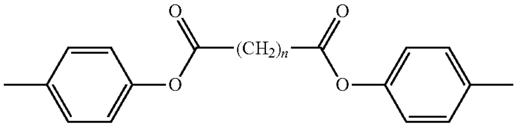
n = 2 ~ 5
(Y1-b68)
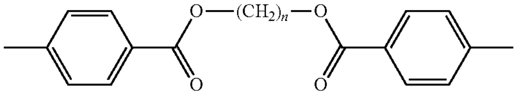
n = 2 ~ 5
(Y1-b69)
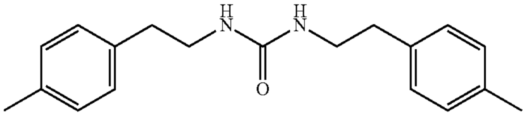
(Y1-b70)
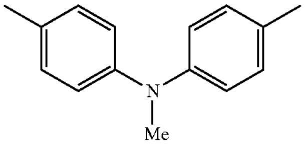
(Y1-b71)
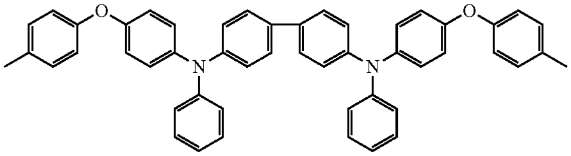
(Y1-b72)
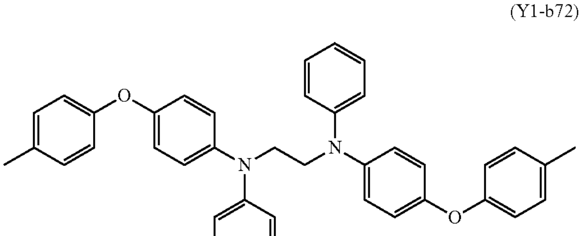
(Y1-b73)
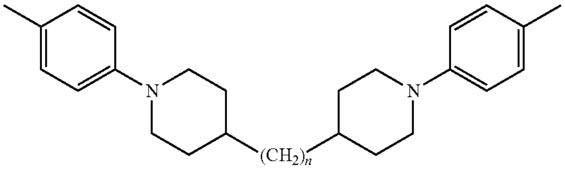
n = 1 ~ 5

-continued (Y1-b75)

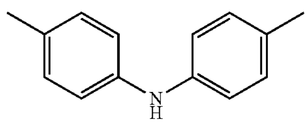

(Y1-b76)

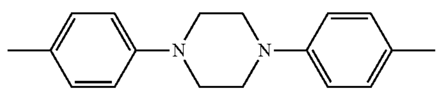

(Y1-b77)

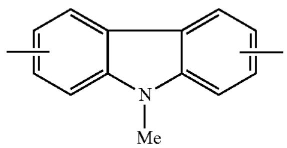

(Y1-b78)

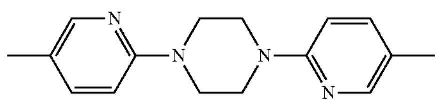

(Y1-b79)

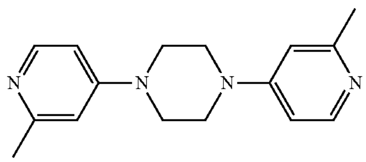

(Y1-b80)

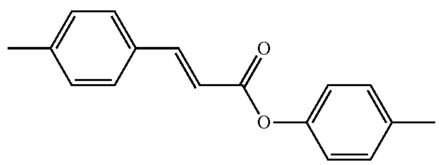

(Y1-b81)

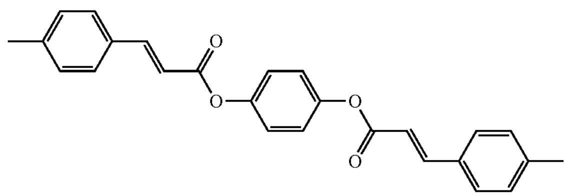

the A1 of the formula (Y1-a2) is a single bond, an ester bond, an amide bond, a thioester bond, or a divalent organic group having 2 to 20 carbon atoms, the A2 of the formula (Y1-a1) and the formula (Y1-a2) is a hydrogen atom, a halogen atom, a hydroxyl group, an amino group, a thiol group, a nitro group, a phosphoric acid group, or a monovalent organic group having 1 to 20 carbon atoms, the a of the formula (Y1-a1) and the formula (Y1-a2) is an integer of 1 to 4, and the b and the c of the formula (Y1-a2) are independently an integer of 1 to 2.

9. The method of manufacturing a display device according to claim 8, wherein the X1 is any of formulas (X1-11) to (X1-17).

(X1-11)

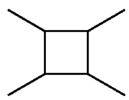

-continued (X1-12)

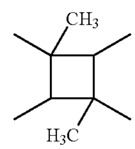

(X1-13)

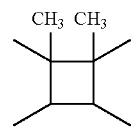

(X1-14)

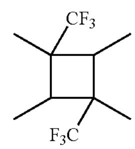

(X1-15)

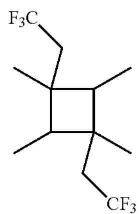

(X1-16)

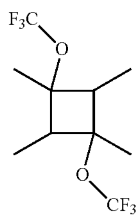

(X1-17)

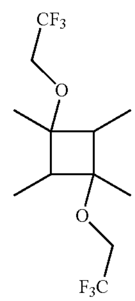

10. The method of manufacturing a display device according to claim 8, wherein the formula (Y1-a1) and the formula (Y1-a2) contain an atom having an electronegativity of 3 or more at a site other than amine of diamine.

11. The method of manufacturing a display device according to claim 8, wherein the Y1 is any one of the formulas (Y1-b11) to (Y1-b14), the formulas (Y1-b21) to (Y1-b22), the formulas (Y1-b29) to (Y1-b31), the formulas (Y1-b33) to (Y1-b34), the formulas (Y1-b36) to (Y1-b38), the formulas (Y1-b44) to (Y1-b45), the formulas (Y1-b52) to (Y1-b54), the formulas (Y1-b57) to (Y1-b63), and the formulas (Y1-b65) to (Y1-b81).

12. The method of manufacturing a display device according to claim 8, wherein a film thickness of the first alignment film and a film thickness of the second alignment film are 10 nm or more and 60 nm or less, respectively.

13. The method of manufacturing a display device according to claim 8, wherein a film thickness of the first alignment film and a film thickness of the second alignment film are 20 nm or more and 50 nm or less, respectively.

* * * * *